United States Patent [19]

Igarashi et al.

[11] Patent Number: 5,515,612
[45] Date of Patent: May 14, 1996

[54] APPARTUS FOR MEASURING THE SHAPE OF A FRAME OF SPECTACLES

[75] Inventors: Takashi Igarashi, Akishima; Shuichi Sato, Ome, both of Japan

[73] Assignees: Hoya Corporation; Hoya Information System Corporation, both of Tokyo, Japan

[21] Appl. No.: 179,033

[22] Filed: Jan. 6, 1994

[30] Foreign Application Priority Data

Jan. 8, 1993 [JP] Japan .............................. 5-000230 U
Jan. 8, 1993 [JP] Japan .............................. 5-000231 U

[51] Int. Cl.$^6$ .................................................. G01B 7/28
[52] U.S. Cl. .............................. 33/200; 33/551; 33/507; 33/28
[58] Field of Search .................. 33/200, 551, 553, 33/507, 28

[56] References Cited

U.S. PATENT DOCUMENTS

| | | | |
|---|---|---|---|
| 4,051,601 | 10/1977 | Godot | 33/553 |
| 4,724,617 | 2/1988 | Logan et al. | 33/28 |
| 4,991,305 | 2/1991 | Saigo et al. | 33/507 |
| 4,995,170 | 2/1991 | Brulé et al. | 33/551 |

FOREIGN PATENT DOCUMENTS

| | | | |
|---|---|---|---|
| 0298129 | 1/1989 | European Pat. Off. | |
| 2665387 | 2/1992 | France | |
| 4107894 | 9/1991 | Germany | 33/200 |
| 4024272 | 2/1992 | Germany | |
| 4126313 | 3/1992 | Germany | |

*Primary Examiner*—Christopher W. Fulton
*Attorney, Agent, or Firm*—Armstrong, Westerman, Hattori, McLeland & Naughton

[57] ABSTRACT

An apparatus for measuring the shape of a frame of spectacles is provided wherein the shape of a frame is measured with a measuring element which is held in contact with a groove in a rim of the frame while being moved along the groove. To accurately position the measuring element with respect to the groove of the frame before the start of measurement, a positioning device is provided which moves the measuring element horizontally toward the frame, presses the measuring element against the frame with a biasing force, and positions the measuring element at a measurement position. Further, to permit smooth vertical movement of the measuring element and to achieve accurate shape measurement, a thrust device is provided which pushes the lower end face of a measuring element supporting shaft upward at a location displaced from the axis of the shaft. To accurately position the measuring element for accurate shape measurement, the measuring element supporting shaft has a projection located between the measuring element and intervening mechanism. Further, to reliably hold the frame with ease and to prevent deformation of the same, a turning mechanism is provided for turning at least one of two holding members parallel to the plane of the frame rim, the holding members contacting the upper and lower portions, respectively, of the frame to thereby hold the frame.

12 Claims, 28 Drawing Sheets

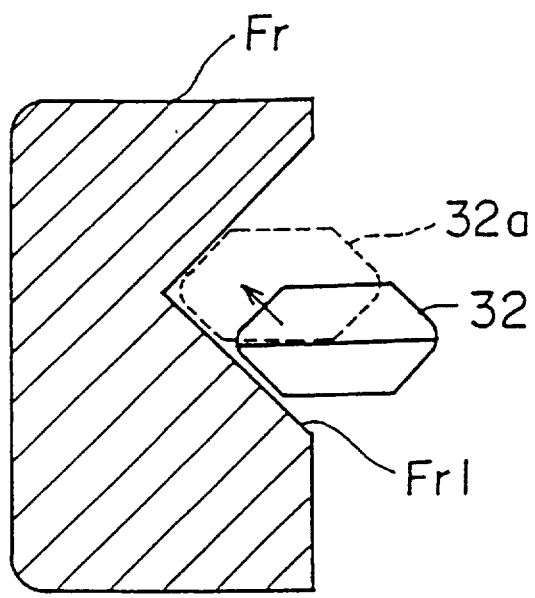
F I G. 25 (A)
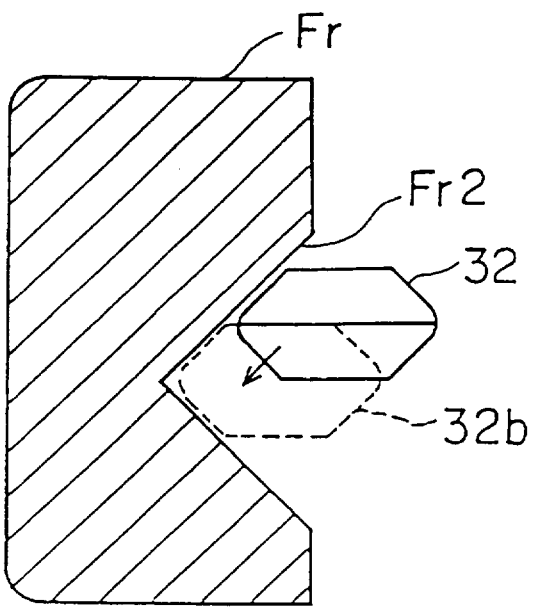
F I G. 25 (B)

APPARTUS FOR MEASURING THE SHAPE OF A FRAME OF SPECTACLES

BACKGROUND OF THE INVENTION (1) Field of the Invention

The present invention relates to an apparatus for measuring the shape of a frame of spectacles wherein the shape of a frame is measured with a probe which is held in contact with a groove of the frame while being moved along the groove.

(2) Description of the Related Art

When measuring the shape of a frame of spectacles by using a conventional measuring apparatus, a probe is manually moved and fitted in a groove of the frame held by the measuring apparatus, and then a measurement start button is pressed to move the probe along the frame groove.

Accordingly, there has been a demand for the development of a measuring apparatus that requires the least possible manual operation.

To meet the demand, an apparatus has been developed wherein the probe is automatically moved toward the frame of spectacles held in a predetermined hold position and is fitted in the frame groove. More specifically, the apparatus comprises actuating means for moving a table, to which a stylus is mounted, in the direction of a plane of the frame (horizontal direction), and lifting means for raising the stylus to a predetermined height. Before measurement is started, the table is horizontally moved by the actuating means to position the stylus at approximately the center of one of the right and left rims of the frame, and then the stylus head (probe) is raised by the lifting means to the predetermined height corresponding to the groove in the frame rim. Subsequently, the table is horizontally moved by the actuating means to a position such that the probe contacts the frame rim.

However, when the probe is automatically moved toward the frame held at the predetermined hold position, the probe sometimes fails to be fitted in the frame groove.

Namely, the measuring apparatus clamps the frame on the front and rear of the same (in a direction perpendicular to the plane of the frame), and the frame groove in which a lens is to be fitted is not always located at the middle point between the front and rear sides of the frame rim. Accordingly, if, for example, the probe is automatically moved toward the frame held at the predetermined hold position, on the assumption that the groove of the frame rim is located at the middle point between the front and rear sides of the rim, the probe can become displaced from the frame groove. If measurement is started with the probe thus improperly positioned, erroneous measurement values are continuously output at least for a while, even though the probe is thereafter properly fitted in the frame groove.

A conventional frame shape measuring apparatus disclosed, e.g., in Japanese Examined Patent Publication (KOKOKU) No. 4-55824, has a stylus which is composed of a frame measurement probe having an abacus bead-like shape, and a contact section for contacting a frame template.

This type of conventional apparatus is, however, intended for two-dimensional measurement, and has a problem in that the stylus is complicated in shape and that the stylus itself is very heavy in weight.

Meanwhile, in order to machine lenses with high accuracy with respect to the frame, the frame shape must be measured with precision, and thus three-dimensional measurement is required. The requirement for the stylus, in this case, is that the probe should faithfully trace the groove of the frame or the outer periphery of the frame template, and in particular, that the stylus should be smoothly movable in the axial direction.

If the stylus is heavy, for example, the contact pressure acting upon the frame or the frame template is so large that the frame or the frame template may be deformed so that an accurate shape of the frame cannot be measured.

In order to allow the stylus, whose axis extends vertically, to move smoothly in the vertical direction with accuracy, cylindrical guiding means should preferably be disposed around the outer periphery of a stylus supporting shaft. Moreover, to permit the stylus supporting shaft to move smoothly relative to the guiding means, suitable intervening means, such as a rolling bearing should preferably be provided between the stylus supporting shaft and the guiding means. As a means of automating the measuring apparatus, an additional mechanism may be provided wherein thrusting means coupled to a motor, or the like, is arranged at the lower end of the stylus supporting shaft to vertically move the supporting shaft such that the stylus can be automatically positioned with respect to the groove of the frame or the outer periphery of the frame template.

Where such mechanism is employed, if the tolerance for the intervening means fitted between the stylus supporting shaft and the guiding means is too strict, then free vertical movement of the stylus is hindered during measurement. Although the stylus can be satisfactorily lifted by the thrusting means before measurement, the stylus may fail to descend after measurement, because it must descend by its own weight.

To avoid such inconvenience, the tolerance for the intervening means fitted between the stylus supporting shaft and the guiding means may be set to a larger value. In this case, the stylus descends by its own weight after measurement when released from the pressure horizontally acting thereon from the frame or the frame template, but the intervening means may stick to the guiding means due to viscosity of lubricating oil and fail to descend. When measurement is thereafter carried out again and the stylus supporting shaft lifts, with the axis thereof slightly inclined to the axis of the intervening means or guiding means, no slip is allowed between the stylus supporting shaft and the intervening means. Thus, after the intervening means reaches its highest position, further upward movement of the stylus supporting shaft may be hindered by the intervening means, with the result that the stylus cannot be positioned at the frame groove or at the outer periphery of the frame template.

Generally, the frame shape measuring apparatus is provided with a holding device for firmly fixing the frame during measurement. Conventional holding devices are classified into a type wherein the frame is clamped from its sides by holding members, and a type wherein the frame is clamped at four points from above and below.

FIG. 1 is a schematic plan view of a conventional holding device for holding a frame of spectacles by means of holding members. At least one of two holding members 307 and 308 is movable so that the two members can approach and separate from each other. In this holding device, a frame 306 is clamped between the holding members 307 and 308 with a predetermined force in such a manner that the opposing surfaces of the holding members contact the frame at four points P1 to P4 on the outer peripheral surfaces of right and left frame rims 306a and 306b. Hence, the frame 306 is held in position.

FIG. 2 is a schematic side view of a conventional holding device for clamping a frame at four points from above and below. A movable member 312 has a supporting member 314a and a presser member 314b for clamping a rim 311a of a frame 311 from below and above, and also has a supporting member 315a and a presser member 315b for clamping the other rim 311b from below and above. Another movable member 313 has two pairs of elements having similar functions, i.e., a supporting member 316a and a presser member 316b; and a supporting member 317a and a presser member 317b.

In the prior art shown in FIG. 1, the frame rims 306a and 306b are clamped from sides at four points P1 to P4. Accordingly, if the respective frame rims 306a and 306b have different sizes, the frame fails to contact the supporting members at all four points P1 to P4, and is eventually held at three points. Consequently, the frame 306 is unstably held, and the position thereof may be displaced during measurement of the frame shape. To avoid such displacement, the clamping force of the holding members 307 and 308 may be increased. In this case, however, the frame 306 is deformed, making it impossible to accurately measure the frame shape.

In the prior art shown in FIG. 2, the frame 311 is held from above and below; therefore, if applied with even a small force in the direction of the plane of the frame, the frame 311 may be displaced in that direction. To avoid this, the force of clamping the frame 311 must be increased. If, however, the clamping force is too large, the frame 311 is deformed, making it impossible to accurately measure the frame shape, as in the case of the prior art shown in FIG. 1.

SUMMARY OF THE INVENTION

A first object of the present invention is to provide a frame shape measuring apparatus capable of accurately bringing a measuring element into contact with a groove of a frame of spectacles at the start of measurement.

A second object of the present invention is to provide a frame shape measuring apparatus which permits smooth vertical movement of the measuring element and thus is capable of accurate shape measurement.

A third object of the present invention is to provide a frame shape measuring apparatus which can accurately position the measuring element, thereby permitting accurate shape measurement.

A fourth object of the present invention is to provide a frame shape measuring apparatus capable of reliably holding a frame of spectacles with ease and preventing deformation of the frame.

To achieve the first object, a frame shape measuring apparatus is provided which comprises holding means for holding a frame of spectacles at a predetermined hold position, measuring element actuating means for moving a measuring element to a predetermined horizontal origin position associated with one of the right and left rims of the frame, then moving the measuring element to a predetermined vertical origin position in a Z-axis direction parallel to an axis of the measuring element, and holding the measuring element at the predetermined vertical origin position, and positioning means including first moving means for moving the measuring element, held at the predetermined vertical origin position, horizontally toward the frame and pressing the measuring element against the frame with a biasing force, the positioning means positioning the measuring element at a measurement position by means of the first matching means.

To achieve the second object, the measuring element actuating means includes a movable table moved in a direction perpendicular to the axis of the measuring element, an outer cylinder mounted on the movable table, for guiding the measuring element in an axial direction thereof, a measuring element supporting shaft extending through the outer cylinder from the measuring element along the axis thereof, intervening means including a rolling member and a retainer interposed between the outer cylinder and the measuring element supporting shaft, and thrust means for pushing a lower end face of the measuring element supporting shaft upward at a location displaced from the axis of the measuring element supporting shaft.

To achieve the third object, measuring element means includes a measuring element, an outer cylinder for axially guiding the measuring element, intervening means including a rolling member and a retainer arranged inside the outer cylinder, and a measuring element supporting shaft extending from one end of the measuring element in an axial direction thereof and inserted through the intervening means, the measuring element supporting shaft having a projection formed at a portion thereof between the intervening means and the measuring element.

To achieve the fourth object, the holding means includes two holding members capable of contacting upper and lower portions, respectively, of the frame to thereby hold the frame, at least one of the two holding members having a contact surface against which the frame is pressed in one of upward and downward directions thereof, a turning mechanism for turning the at least one holding member substantially parallel to a plane of the frame rim, to thereby adjust a contact angle between the at least one holding member and the frame, and a stopper mechanism for stopping the turning motion of the at least one holding member after the contact angle is adjusted by the turning mechanism.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 25(A) is a first sectional view illustrating how a stylus head fits in a frame groove;

FIG. 25(B) is a second sectional view illustrating how the stylus head fits in a frame groove;

DESCRIPTION OF THE PREFERRED
EMBODIMENTS

Figure 1:
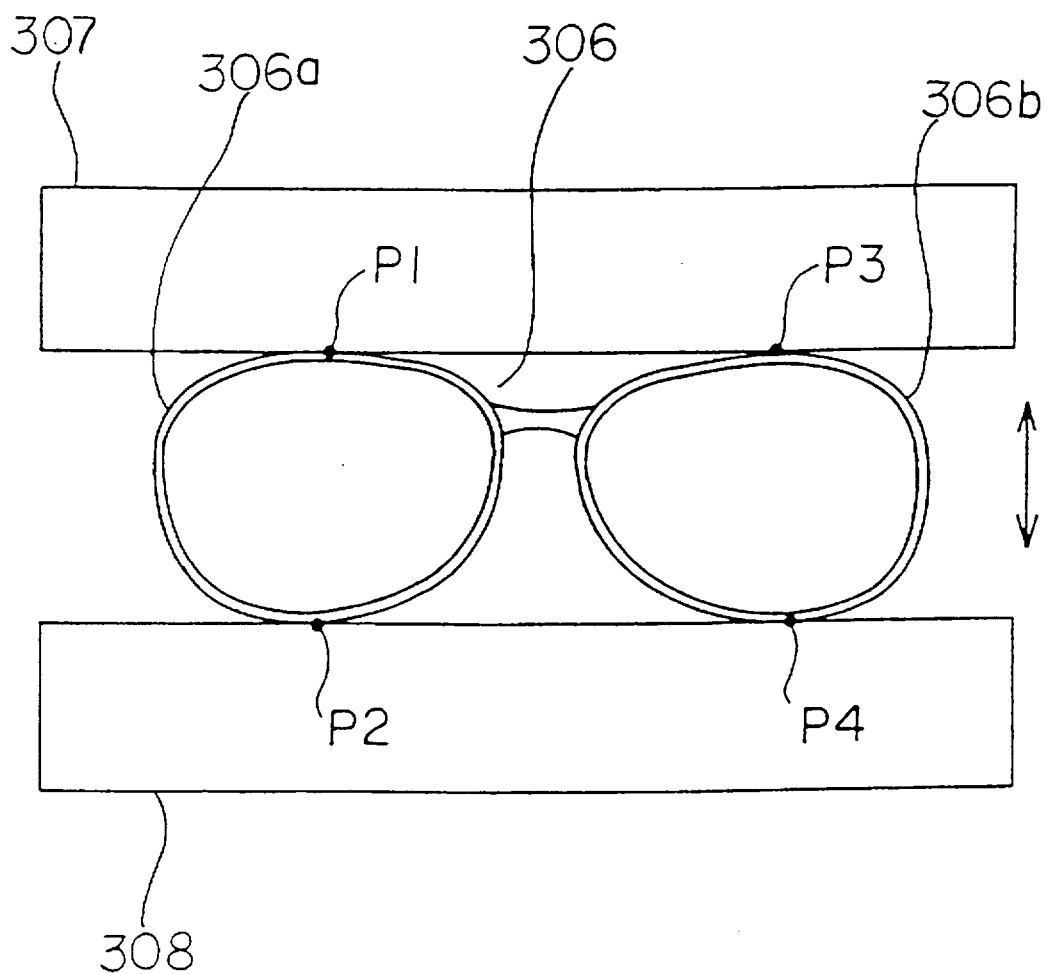
FIG. 1 is a schematic plan view of a conventional holding device in which a frame is held by supporting members.
Figure 2:
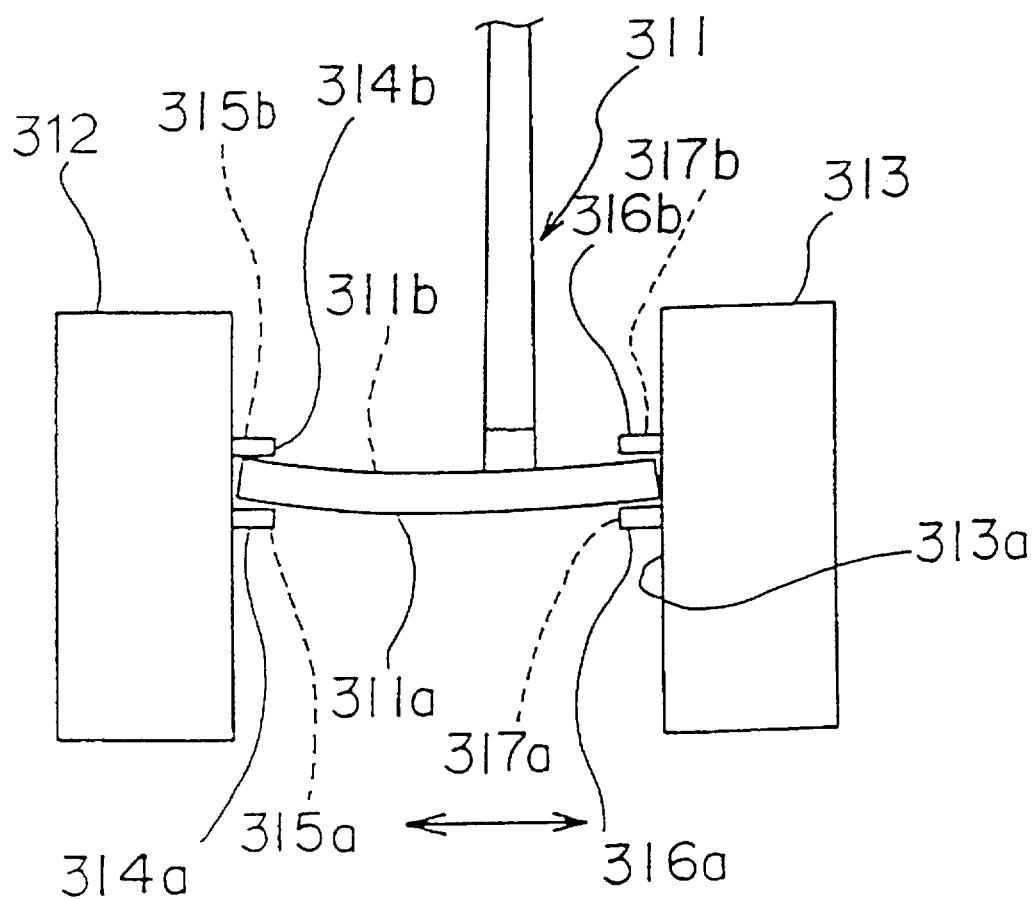
FIG. 2 is a schematic side view of another conventional holding device in which a frame is clamped at four points from above and below.
Figure 3:
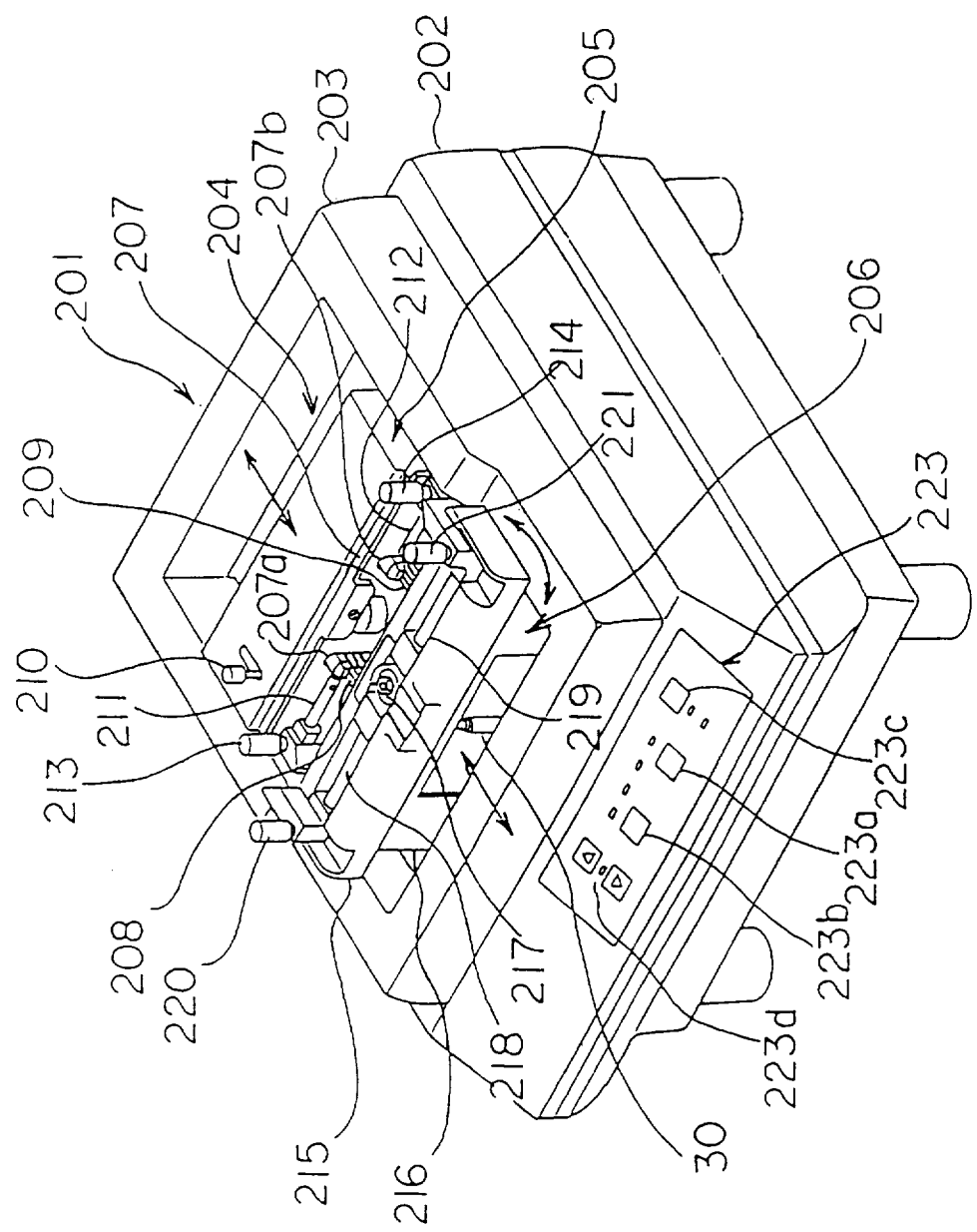
FIG. 3 is a perspective view of a frame shape measuring apparatus.

FIG. 3 is a perspective view of an apparatus for measuring the shape of a frame of spectacles, according to the present invention. A frame shape measuring apparatus 201 has a case 202 as its outer element, which contains a frame holding section, a frame shape measurement section, a control section for controlling the operation of the holding section and measurement section, etc. The frame holding section, frame shape measurement section and control section will be hereinafter described in the order mentioned.

1. Arrangement of Frame Shape Measuring Apparatus

I-1. Arrangement of Frame Holding Section

Referring to FIG. 3, a case 203 having a rectangular frame-like shape is mounted to an upper surface of the case 202, and a frame holding device 204 is arranged inside the case 203. The frame holding device 204 is composed mainly of a rear holder 205 and a front holder 206. The rear and front holders 205 and 206 can be slid simultaneously in opposite directions parallel to the depth direction of the measuring apparatus. Here, various directions are generally denoted based on the orientation of the frame shape measuring apparatus 201. Specifically, a part of the apparatus 201 at which a control panel 223 is located is called the front part, and various elements are expressed with modifiers such as "front," "rear," "left," "right," "upper," "lower," etc. as they are so situated when viewed from the front of the apparatus 201.

A contact plate 207 is arranged at the front side of the rear holder 205, and openings 207a and 207b (FIG. 18) are cut in the contact plate 207 near the center thereof. Clamping sections 208 and 209 project from the rear holder 205 through the openings 207a and 207b, respectively, for clamping respective lower portions of right and left rims of a frame from above and below. When a button 210 is operated, the clamping sections 208 and 209 each clamp the corresponding rim with a predetermined pressure from above and below, and also align the center of thickness of the rim with a predetermined clamping position.

The contact plate 207 is provided with rails 211 and 212 (FIG. 19) extending from side to side (or horizontally), and auxiliary members 213 and 214 are slidably mounted on the rails 211 and 212, respectively. The auxiliary members 213 and 214 serve to clamp the lower portion of the frame from sides of the right and left rims, thereby positioning the frame.

The front holder 206, as shown best in FIGS. 7 to 9 and 19 to 21 is composed mainly of a frame holding member 215 and a supporting base 216 supporting the member 215. The frame holding member 215 is mounted on a mounting section 217 so as to be swingable in a horizontal plane by a predetermined angular range about the section 217. The rear side of the frame holding member 215 is formed as a substantially flat surface, to be brought into contact with upper portions of the frame rims.

The frame holding member 215 is provided with rails 218 and 219 extending from side to side or horizontally, and auxiliary members 220 and 221 are slidably mounted on the rails 218 and 219, respectively. The auxiliary members 220 and 221 serve to clamp the upper portion of the frame from sides of the right and left rims, thereby positioning the frame.

After a frame of spectacles is properly held by the rear and front holders 205 and 206, automatic frame shape measurement by means of a stylus 30 is started, as described later. The automatic measurement is carried out in accordance with a command from a panel 223 arranged at the front part of the case 202.

On the panel 223 are generally provided a start button 223a, a stop button 223b, a clamp button 223c, and a forward/backward motion button 223d. The start button 223a is used to start the automatic measurement, and the stop button 223b is used to stop the automatic measurement in the middle. The clamp button 223c is used to move the clamping sections 208 and 209 toward the rear of the apparatus (backward) by a very small distance. When the clamp button 223c is pressed, the frame holding member 215 is automatically fixed at the current angular position. The forward/backward motion button 223d is used to control the forward/backward movement of the stylus 30 during a manual shape measurement.

Figure 4:
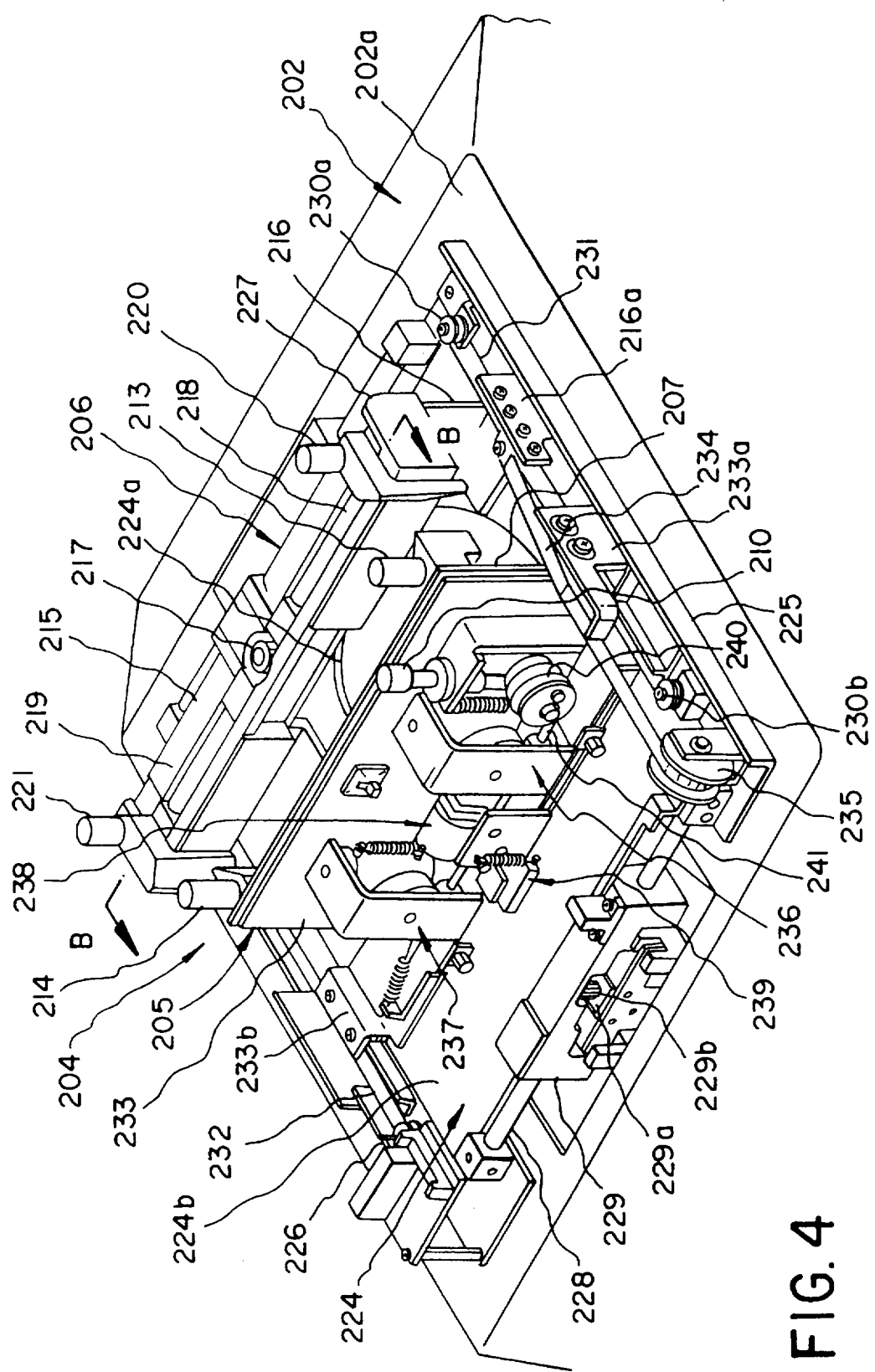
FIG. 4 is a rear perspective view of the frame shape measuring apparatus, with a case detached.

FIG. 4 is a rear perspective view of the frame shape measuring apparatus 201 with the case 203 detached from the apparatus. In the following, various directions are generally denoted based on the orientation of the frame shape measuring apparatus 201, as mentioned above. Namely, the part of the apparatus 201 at which the panel 223 is located is called the front part, and various modifiers such as "front,"

"rear," "left," "right," "upper," "lower," etc. are used on that basis.

The frame holding device 204 is arranged on the upper surface 202a of the case 202, and the rear and front holders 205 and 206 are slidably mounted on a table 224. The table 224 is covered with a sheet 224b of resin, and has an opening 224a cut therein, in which the stylus 30 is allowed to move. Side frames 225 and 226 are arranged at left and right edges, respectively, of the table 224. A rod-shaped shaft 227 connects the front ends of the side frames 225 and 226 to each other, and another rod-shaped shaft 228 connects the rear ends of the side frames 225 and 226 to each other.

The rear shaft 228 is coupled to a horizontal (side-to-side) driving unit 229 fixed to the body of the apparatus. In the horizontal driving unit 229 is arranged a horizontal drive motor 229a having a pinion 229b at an end of a rotary shaft thereof. The horizontal drive motor 229a is positioned such that the pinion meshes with a rack, not shown, formed on the shaft 228. As the horizontal drive motor 229a rotates, the shaft 228 slides to the left or right, depending on the direction of rotation. Further, as the shaft 228 slides sideways, the table 224 and various elements fixed thereto, such as the rear and front holders 205 and 206, move in a body.

Pulleys 230a and 230b are mounted to the side frame 225 in the vicinity of the front and rear end portions thereof, respectively, and a wire 231 is looped around the pulleys 230a and 230b. Similarly, pulleys (not shown) are mounted near the front and rear end portions, respectively, of the side frame 226, and a wire 232 is looped round the pulleys.

To the wires 231 and 232 are connected ends 216a and 216b (the end 216b is not shown), respectively, of the supporting base 216 of the front holder 206 and ends 233a and 233b, respectively, of an L-shaped base 233 supporting the contact plate 207 of the rear holder 205. More specifically, the supporting base 216 is fixed only to the inward side of each of the wires 231 and 232 by screws, and the base 233 is fixed only to the outward side of each of the wires 231 and 232 by screws.

The opposite ends 216a and 216b of the supporting base 216 and the opposite ends 233a and 233b of the base 233 are slidably mounted on rails, not shown, arranged on the side frames 225 and 226, respectively. The end 216a of the supporting base 216 is also connected to one end of a constant force spring 234 by a screw, and the other end of the constant force spring 234 is wound up on a bushing 235 attached to the rear end of the side frame 225, so that the supporting base 216 is pulled rearward.

With the arrangement described above, the rear and front holders 205 and 206 normally remain stationary at approximately the center of the table 224 while contacting each other, and as the operator manually moves one of the holders against the pulling force of the constant force spring 234, the holders 205 and 206 slide in opposite directions by an equal distance. Namely, when the rear holder 205 is moved rearward by a certain distance, the front holder 206 slides forward by the same distance.

Figure 5:
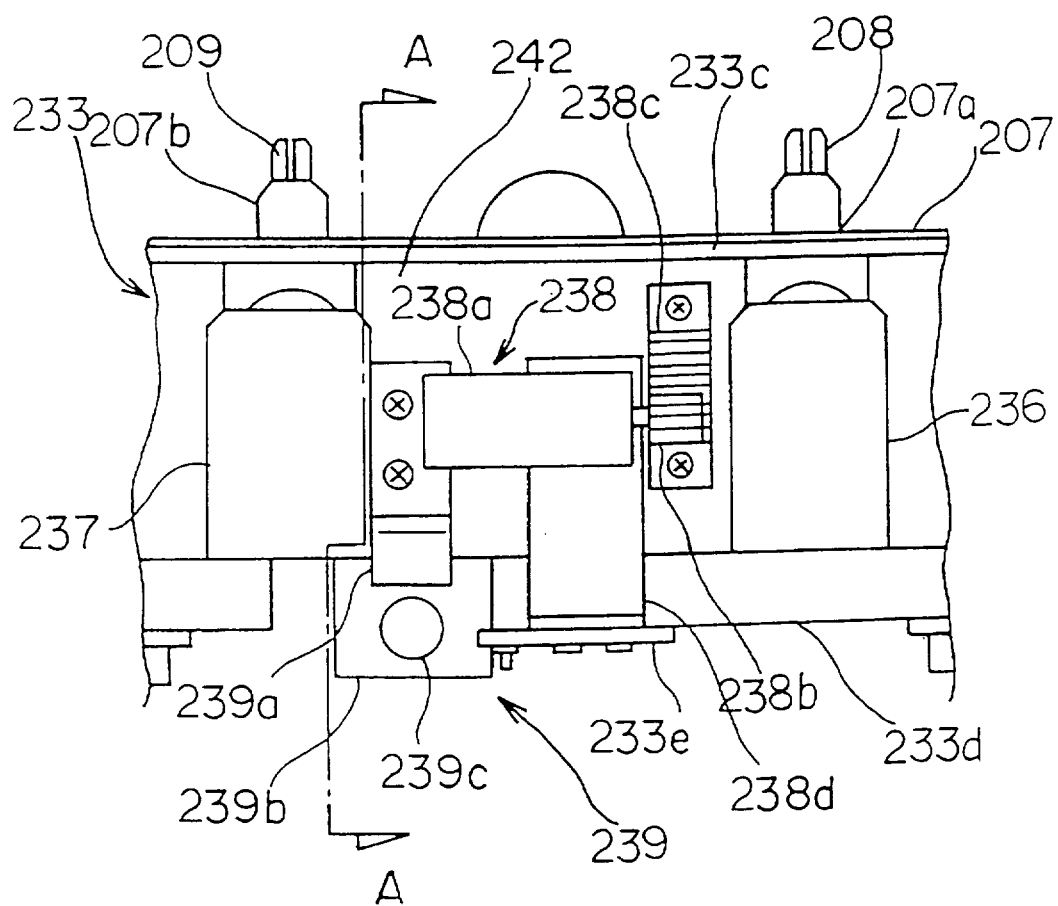
FIG. 5 is a plan view of a central portion of a base.

At the rear of the base 233 as shown in FIGS. 4 and 5 are arranged the button 210, vertical driving units 236 and 237 for vertically moving the clamping sections 208 and 209, respectively, a rearward driving unit 238 for moving the button 210 and the clamping sections 208 and 209 rearward relative to the base 233, and a brake mechanism 239 for stopping the movement of the base 233.

The button 210 is coupled to inner mechanisms of the vertical driving units 236 and 237 via a pulley 240 and a wire 241. When the button 210 is depressed, the downward motion is transmitted to the inner mechanisms of the vertical driving units 236 and 237 through the wire 241, whereby the clamping sections 208 and 209 move vertically.

The various devices arranged on the base 233 will be now described in more detail.

FIG. 5 is a plan view showing the central part of the base 233. The base 233 has a vertical portion 233c to which the contact plate 207 is secured, and a horizontal portion 233d on which a slide table 242 is slidably placed. To the slide table 242 are fixed the button 210, the vertical driving units 236 and 237, part of the rearward driving unit 238, and part of the brake mechanism 239.

The rearward driving unit 238 is composed mainly of a rearward drive motor 238a, a rack 238c, and a base 238d. The rearward drive motor 238a is fixed to the base 238d, and the rack 238c is fixed to the slide table 242 by screws. The base 238d is fixed to a fixing plate 233e vertically rising from the rear end of the horizontal portion 233d.

A pinion 238b is fitted on the shaft of the rearward drive motor 238a and in mesh with the rack 238c. Accordingly, when the rearward drive motor 238a rotates, the force is transmitted to the rack 238c through the pinion 238b, and hence the entire slide table 242 slides forward or backward.

The brake mechanism 239 is composed mainly of a slide member 239a, a brake member 239b, and a convex member 239c. The slide member 239a is fixed to the slide table 242 by screws such that it slides forward or backward together with the table 242. When the slide table 242 is situated at a position closest to the vertical portion 233c of the base 233, the slide member 239a is separated from the convex member 239c, and when the slide table 242 is moved rearward by a predetermined distance, the rear part of the slide member 239a contacts the head of the convex member 239c.

Figure 6:
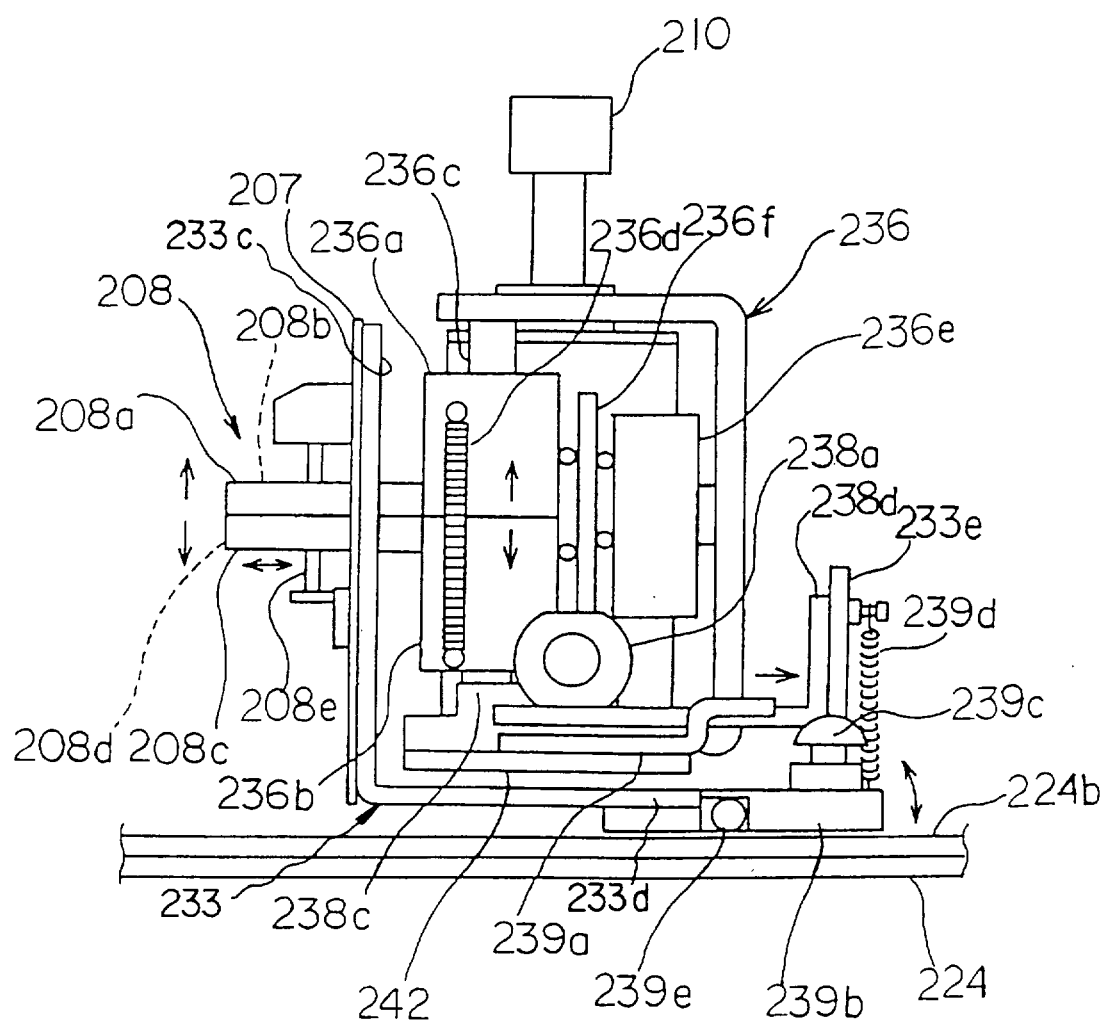
FIG. 6 is a sectional view of the base, taken along line A—A in FIG. 5.

FIG. 6 is a sectional view of the base, taken along line A—A in FIG. 5. As illustrated, only the clamping members 208a to 208d constituting the clamping section 208 (the figure shows the clamping members 208a and 208c alone) project forward from the contact plate 207. The upper clamping members 208a and 208b are secured to an upper driving member 236a of the vertical driving unit 236, and the lower clamping members 208c and 208d are secured to a lower driving member 236b of the same unit 236.

A vertical contact bar 208e is arranged between the illustrated pair of clamping members (208a, 208c), (see FIG. 22(A) and the pair of clamping members (208b, 208d) located behind the illustrated pair in FIG. 6. The contact bar 208e serves to hold a frame of spectacles in cooperation with the clamping members 208a to 208d, and also to maintain a constant distance between the frame and the contact plate 207.

The upper and lower driving members 236a and 236b are disposed to be vertically movable along a shaft 236c extending through the center thereof, and are normally in contact with each other in the vicinity of the middle of the shaft 236c due to the action of a spring 236d. The upper and lower driving members 236a and 236b are both coupled to a rotary member 236e through a coupling member 236f.

The rotary member 236e is coupled to the button 210 via the wire 241 shown in FIG. 4. When the button 210 is pressed down, the rotary member 236e rotates in a plane perpendicular to the paper surface, whereby the upper and lower driving members 236a and 236b move upward and downward, respectively. As the upper and lower driving members 236a and 236b thus separate from each other, the clamping members 208a to 208d fixed thereto correspondingly rise or lower. When the operator stops holding down the button 210, the upper and lower driving members 236a and 236b return to their original position due to the force of the spring 236d. Thus, the upper and lower clamping members 208a–208d move upward or downward by an equal amount, and the center of the clamping stroke remains unshifted, whereby the position at which a frame of spectacles is held is not affected by variation in the thickness of frame rims.

The vertical driving unit 237 and the clamping section 209 are constructed in substantially the same manner as the vertical driving unit 236 and the clamping section 208, respectively, which are in actuality located next thereto, and accordingly, description of these elements is omitted.

The vertical driving unit 236 is normally situated at a position closest to the contact plate 207, and slides rearward when the motor 238a is driven. The motor 238a operates each time the clamp button 223c on the panel 223 is depressed, to slide the slide table 242 by a predetermined distance. However, the rearward movement of the slide table 242 takes place only twice in succession, and when the clamp button 223c is successively depressed three times, the motor 238a rotates in the reverse direction to return the table 242 to the original position.

Each time the slide table 242 slides rearward, also the clamping members 208a to 208d and the slide member 239a move rearward. When the table 242 is slid once, the slide member 239a contacts the head of the convex member 239c and pushes the brake member 239b downward. The brake member 239b is vertically swingable about a pivot 239e.

To the rear end of the brake member 239b is connected one end of a spring 239d, the other end of which is attached to the fixing plate 233e. The brake member 239b is normally held almost horizontally by the resilient force of the spring 239d, and when the convex member 239c is depressed by the slide member 239a, the brake member 239b swings down about the pivot 239e and is pressed against the resin sheet 224b on the table 224. As a result, frictional engagement occurs between the brake member 239b and the sheet 224b, and the motion of the entire base 233 is braked. Hence, the position of each of the rear and front holders 205 and 206 in the depth direction of the apparatus is fixed.

The arrangement of the front holder 206 will be now described.

Figure 7:
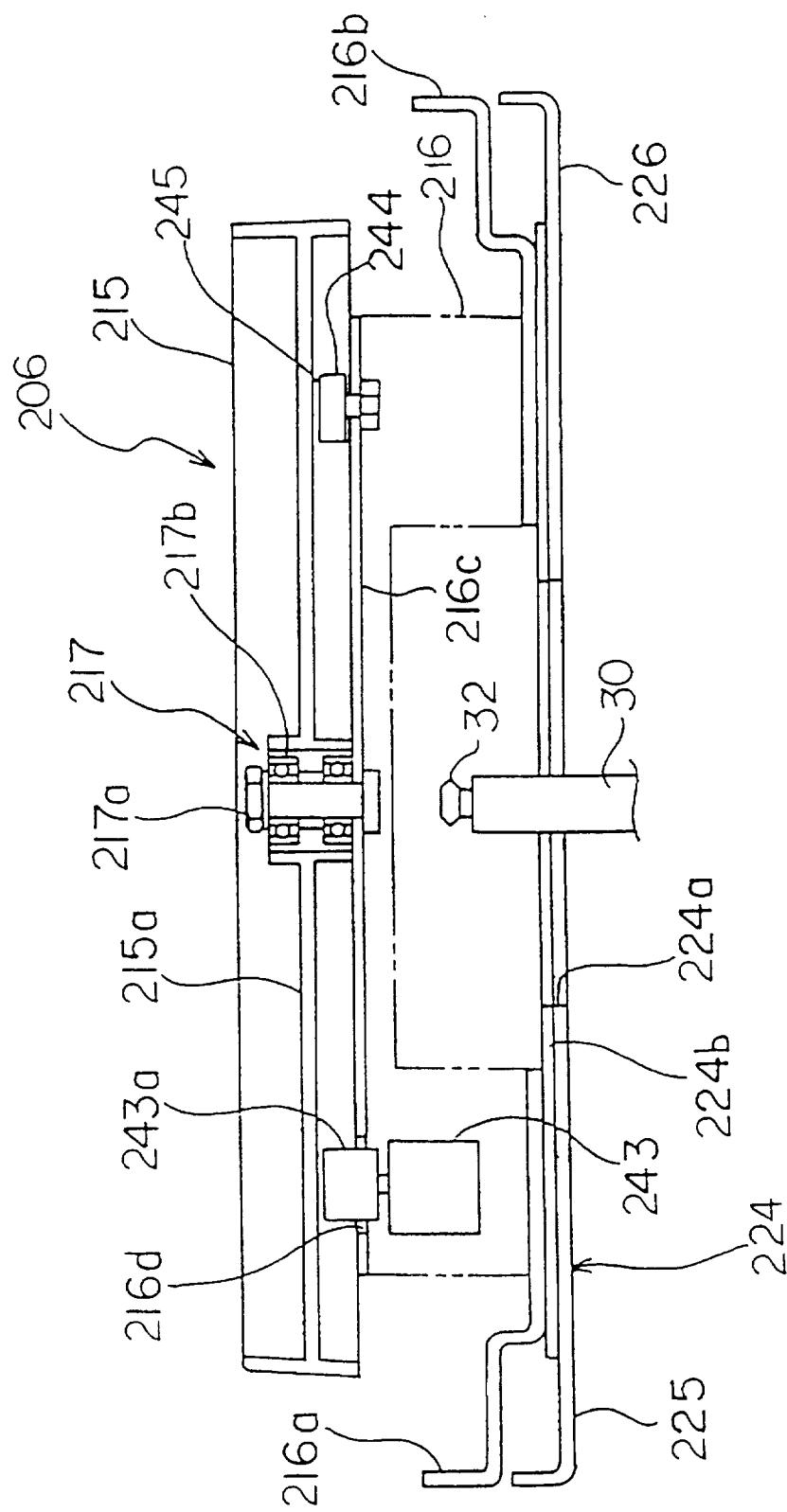
FIG. 7 is a sectional view of the frame shape measuring apparatus, taken along line B—B in FIG. 4.

FIG. 7 is a sectional view of the frame shape measuring apparatus, taken along line B—B in FIG. 4. The frame holding member 215 is situated above an upper plate 216c of the supporting base 216, and is horizontally swingably supported by the mounting section 217 through a bolt 217a and bearings 217b. The frame holding member 215 is somewhat loosely mounted so that it can also make a vertical swinging motion over a very small angle. An intermediate plate 215a is formed inside the frame holding member 215 at approximately half the height thereof.

A thrust motor 243, illustrated in the left-hand part of FIG. 7, is mounted on the supporting base 216. A thrust member 243a is attached to the shaft of the thrust motor 243, and projects into the space surrounded by the frame holding member 215, through an opening 216d cut in the upper plate 216c. The thrust member 243a is a cylindrical member having a diameter slightly smaller than the width between the front and rear inner walls of the frame holding member 215, and abuts against the inner wall of the frame holding member 215 when the member 215 is horizontally turned by a predetermined angle, to thereby prohibit further turn of the frame holding member 215.

Figure 8:
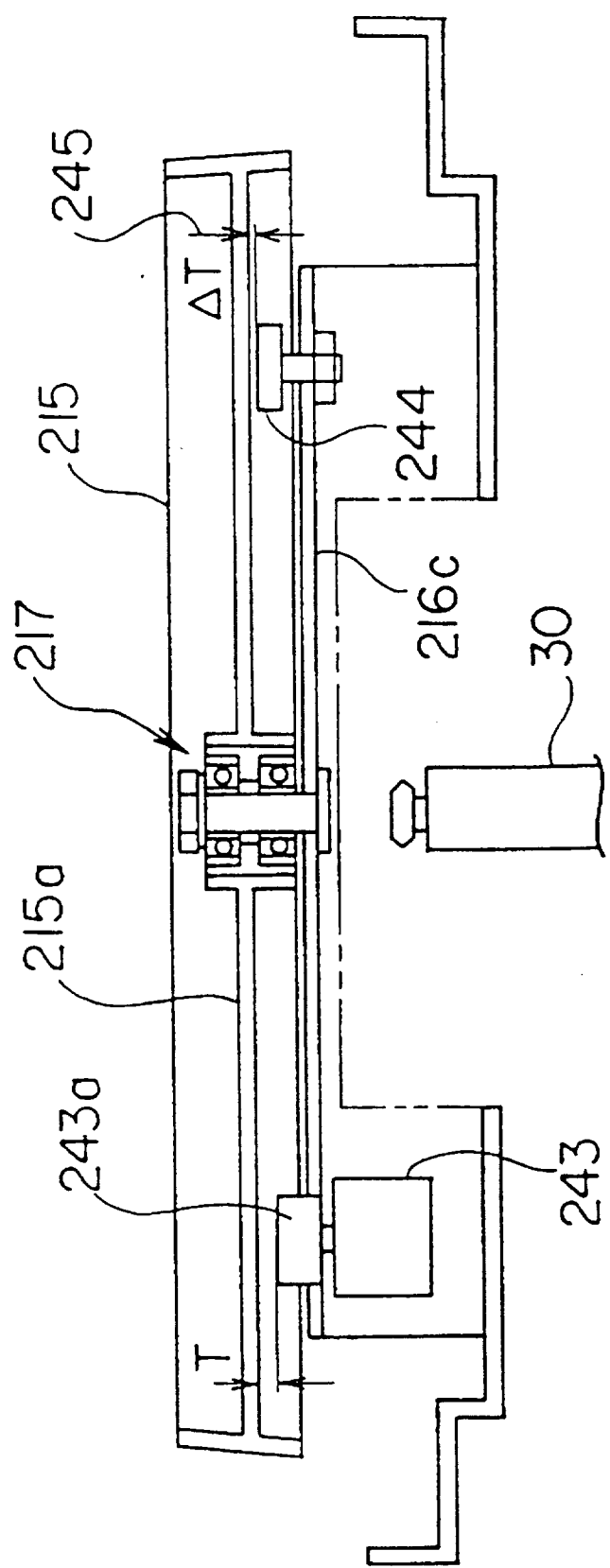
FIG. 8 is a view showing a first state of the frame shape measuring apparatus of FIG. 7.

Further, the thrust member 243a is positioned such that, in normal state, it lightly touches the intermediate plate 215a or is spaced therefrom by a small gap (T) as shown in FIG. 8. When the thrust motor 243 is operated, the thrust member 243a rises and pushes the intermediate plate 215a upward, to thereby slightly tilt the entire frame holding member 215 in the clockwise direction, as viewed in FIGS. 7 and 8.

Figure 9:
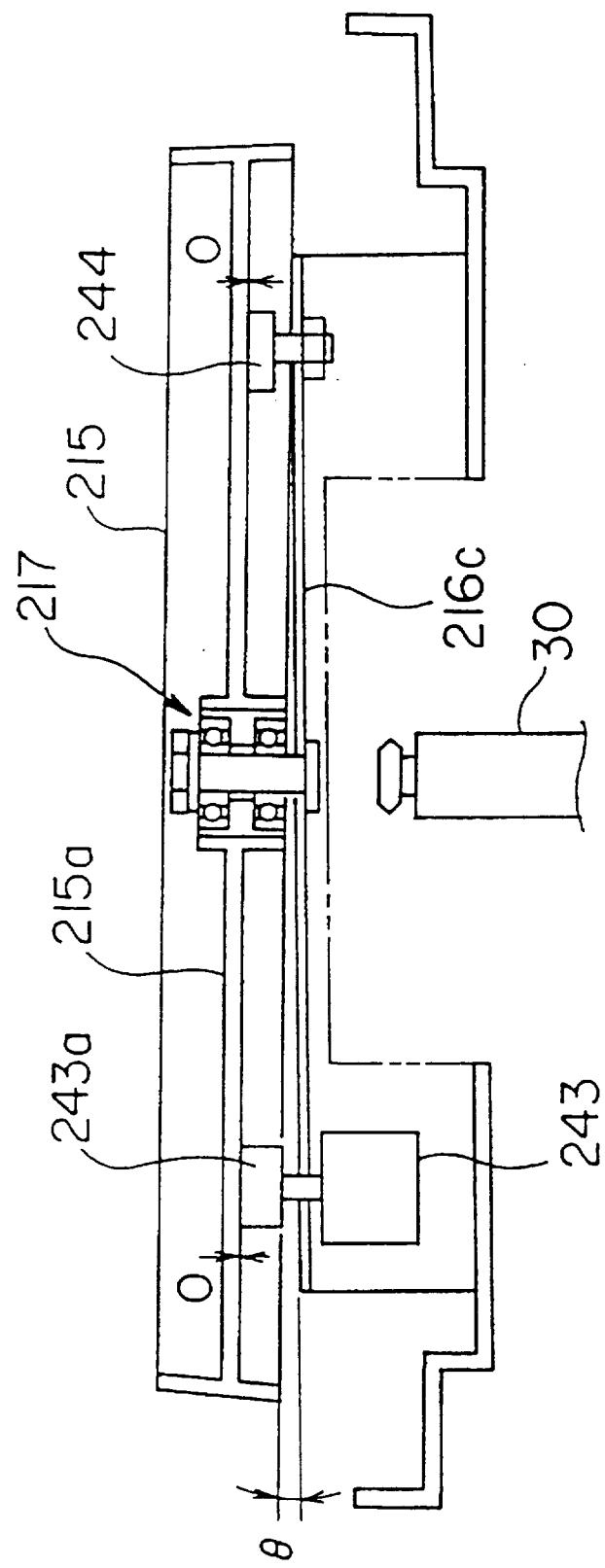
FIG. 9 is a view showing a second state of the frame shape measuring apparatus of FIG. 7.

A stopper 244 is fixed to the right-hand part (FIG. 7) of the upper plate 216c by a screw. The stopper 244 is positioned such that, in normal state, a small gap 245 ($\Delta T$ in FIG. 8) is provided between the upper surface thereof and the intermediate plate 215a. Accordingly, when the thrust motor 243 is operated and the frame holding member 215 is tilted, as shown in FIG. 9, the stopper 244 contacts the intermediate plate 215a, and horizontal turn of the frame holding member 215 is prevented by the force of friction. Since the frame holding member 215 is in practice tilted by a very small angle, the inclination of the member 215 in no way affects the state of contact with a frame of spectacles. As an alternative means of stopping the swinging motion, an additional motor may be used to control the swinging motion, or an additional mechanism including a member for controlling the swinging motion may be provided, instead of the illustrated example.

An initial Z-direction actuating mechanism for moving the stylus 30 in an axial direction thereof (Z direction) to a predetermined horizontal position will be now described.

Figure 10:
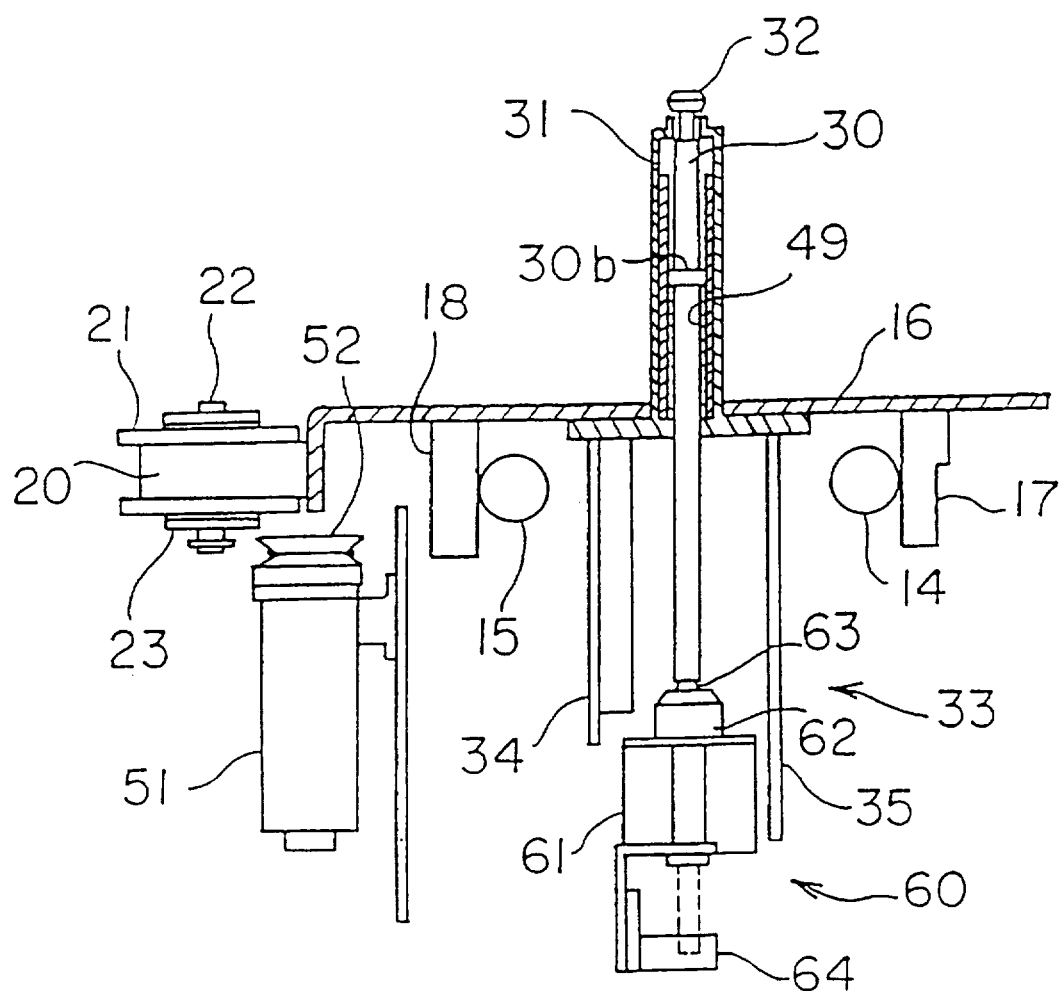
FIG. 10 is a side view of an initial Z-direction actuating mechanism.

FIG. 10 is an enlarged side view of an upper part of the initial Z-direction actuating mechanism 60 shown in FIG. 16, explained in detail later. The actuating mechanism is fixed to the slide plate 16, and is composed of a Z-direction motor 61 comprising a stepping motor, a gear assembly 62 driven by the Z-direction motor 61, a thrust shaft 63 extending through the Z-direction motor 61 and moved in the vertical direction (FIG. 10) by the gear assembly 62, and an origin sensor 64 operated by the lower end of the thrust shaft 63.

The thrust shaft 63 normally remains at a position where the origin sensor 64 is turned on. When supplied with a predetermined number of electric pulses, the Z-direction motor 61 lifts the thrust shaft 63 to push the stylus 30 upward. The Z-direction motor 61 stops when the stylus 30 reaches a predetermined position, and the stylus 30 is held at this position until electric current is passed through the Z-direction motor 61 in the reverse direction. When supplied with reverse current, the Z-direction motor 61 lowers the thrust shaft 63 and the origin sensor 64 turns on, whereupon the current supply to the motor 61 is stopped.

I-1-1. Arrangement of Stylus

The arrangement of the stylus in the initial Z-direction actuating mechanism 60 shown in FIG. 10 will be now described.

Figure 11:
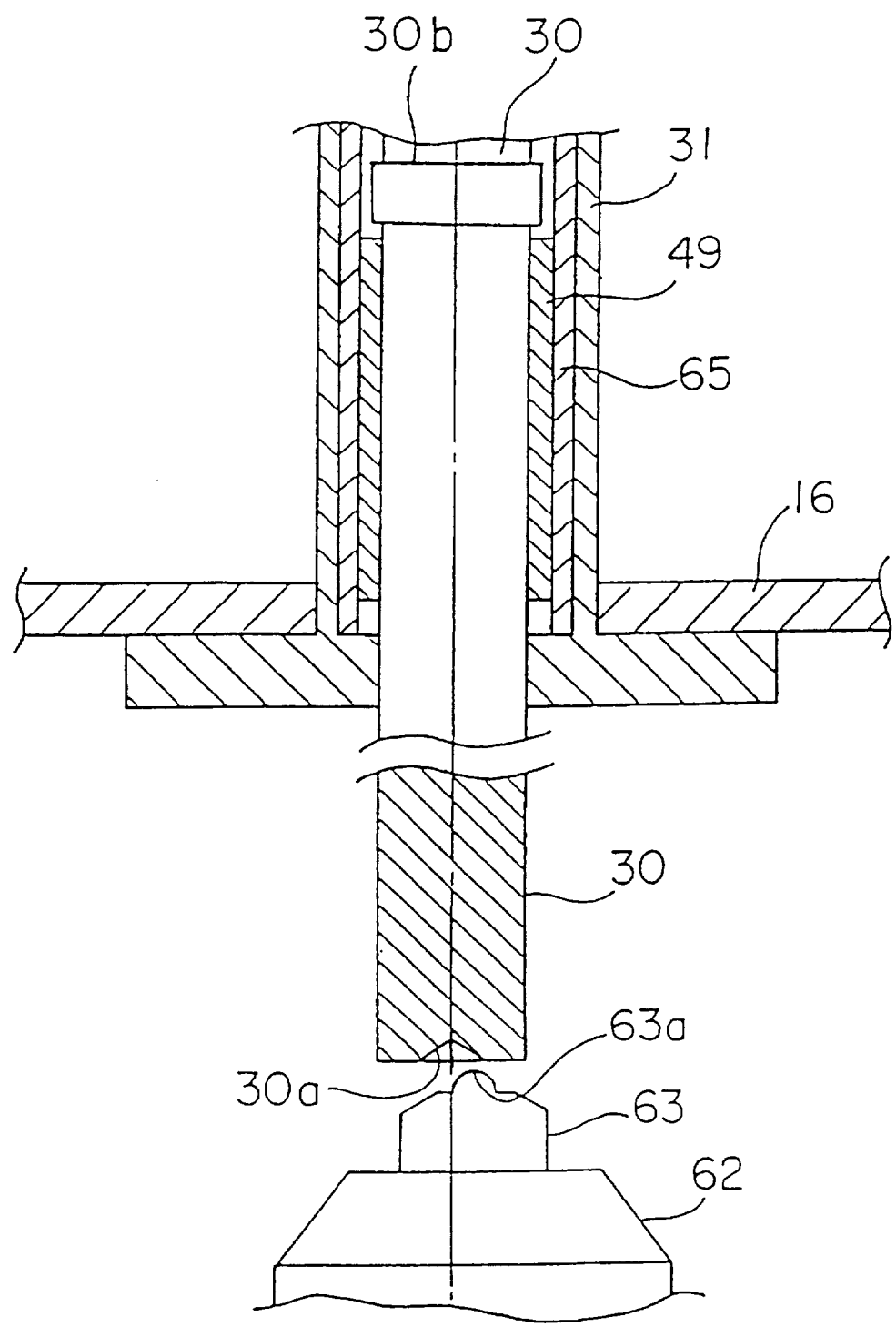
FIG. 11 is a sectional side elevation showing a cage, a lower end of a stylus, and an upper end of a thrust shaft on an enlarged scale.

FIG. 11 is a sectional side elevation illustrating intervening means defined by a cage, the lower end of the stylus, and the upper end of the thrust shaft on an enlarged scale. An outer cylinder 65 is arranged inside a sleeve 31 which is fixed to the slide plate 16, and a cage 49 is arranged inside the outer cylinder 65. The arrangement of the cage 49 forming the intervening means will be explained with reference to FIG. 12.

Figure 12:
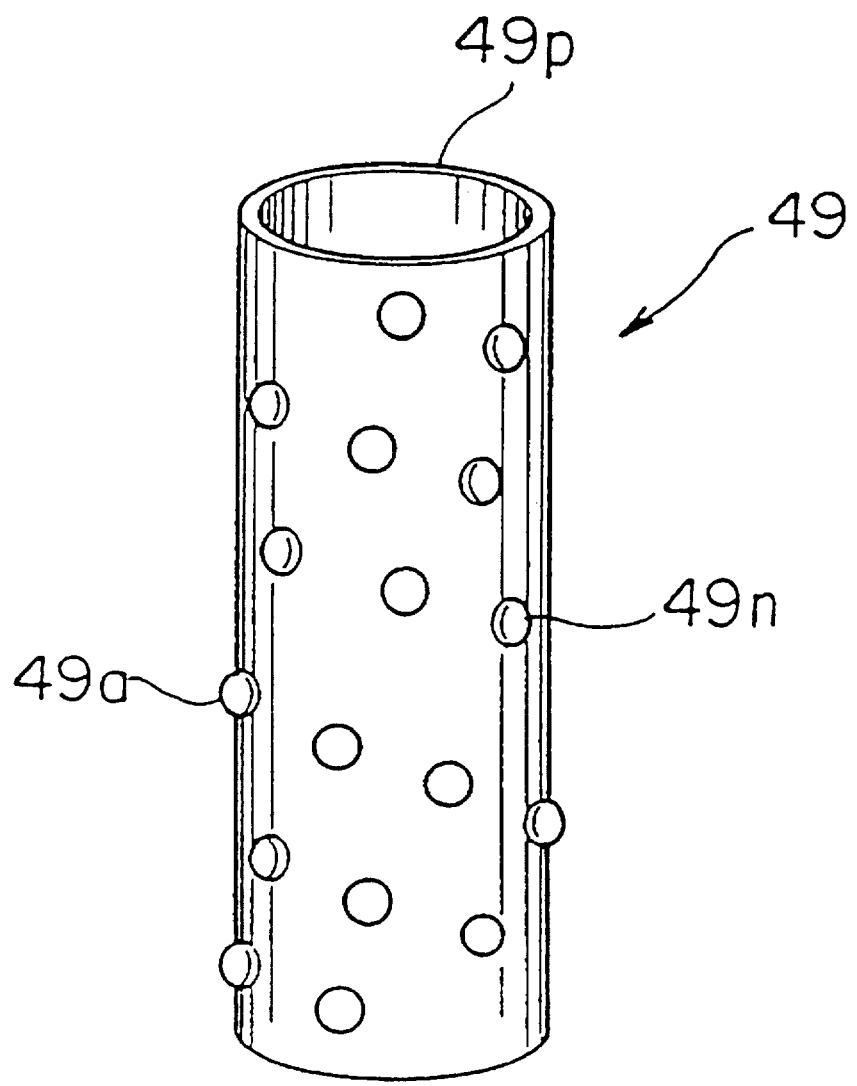
FIG. 12 is a perspective view of the cage.

FIG. 12 is a perspective view of the cage 49. The cage 49 comprises a large number of balls 49a to 49n, and a cylindrical retainer 49p rotatably retaining the balls. Each of the balls 49a to 49n projects both inside and outside of the retainer 49p.

Referring again to FIG. 11, the column portion of the stylus 30 extends inside the cage 49, and has an outer diameter slightly smaller than the inner diameter of the cage 49 (i.e., the diameter of a cylinder formed by connecting the innermost points on the balls 49a to 49n). More specifically, there is a difference of about 1% between the outer diameter of the column portion and the inner diameter of the cage 49. This small gap permits a slip between the column portion of the stylus 30 and the cage 49.

A recess 30a is cut in the lower end face of the stylus 30. The recess 30a is tapered about the axis of the column portion of the stylus 30. The thrust shaft 63 is positioned eccentrically with respect to the recess 30a facing the shaft 63. Specifically, the thrust shaft 63 is positioned such that, when it lifts, an axial protuberance 63a formed at a distal end thereof contacts the tapered surface of the recess 30a. The protuberance 63a has a smooth tip and has a spherical shape, for example.

Owing to this eccentric positioning, when the stylus 30 is pushed up by the thrust shaft 63, it is slightly inclined with respect to the lengthwise direction of the cage 49. Consequently, the column portion of the stylus 30 partially closely contacts the cage 49, whereby no slip is allowed between the two members. Accordingly, when the stylus 30 is lifted, also the cage 49 rises by an amount exactly half the lift amount by which the stylus 30 is raised.

As shown in FIG. 11, the stylus 30 has a peripheral land 30b formed on an intermediate portion of the column portion and having an outer diameter greater than the outer diameter of the column portion and smaller than the inner diameter of the outer cylinder 65. The axial position of the land 30b is set such that, when the cage 49 is located at a predetermined lowest position (the position shown in FIG. 14) and the stylus 30 is located at a predetermined lowest position (origin position shown in FIG. 14), the lower end of the land 30b contacts the upper end of the cage 49.

Figure 13:
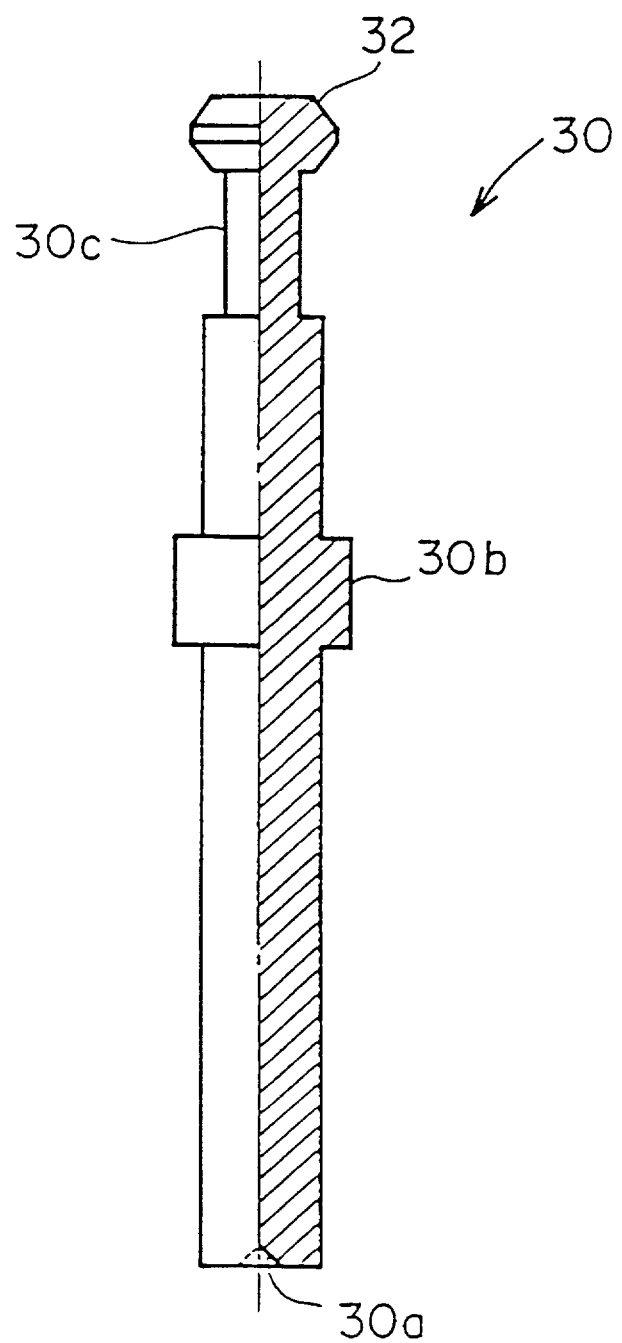
FIG. 13 is a partially sectional view of the stylus with a land.
Figure 14:
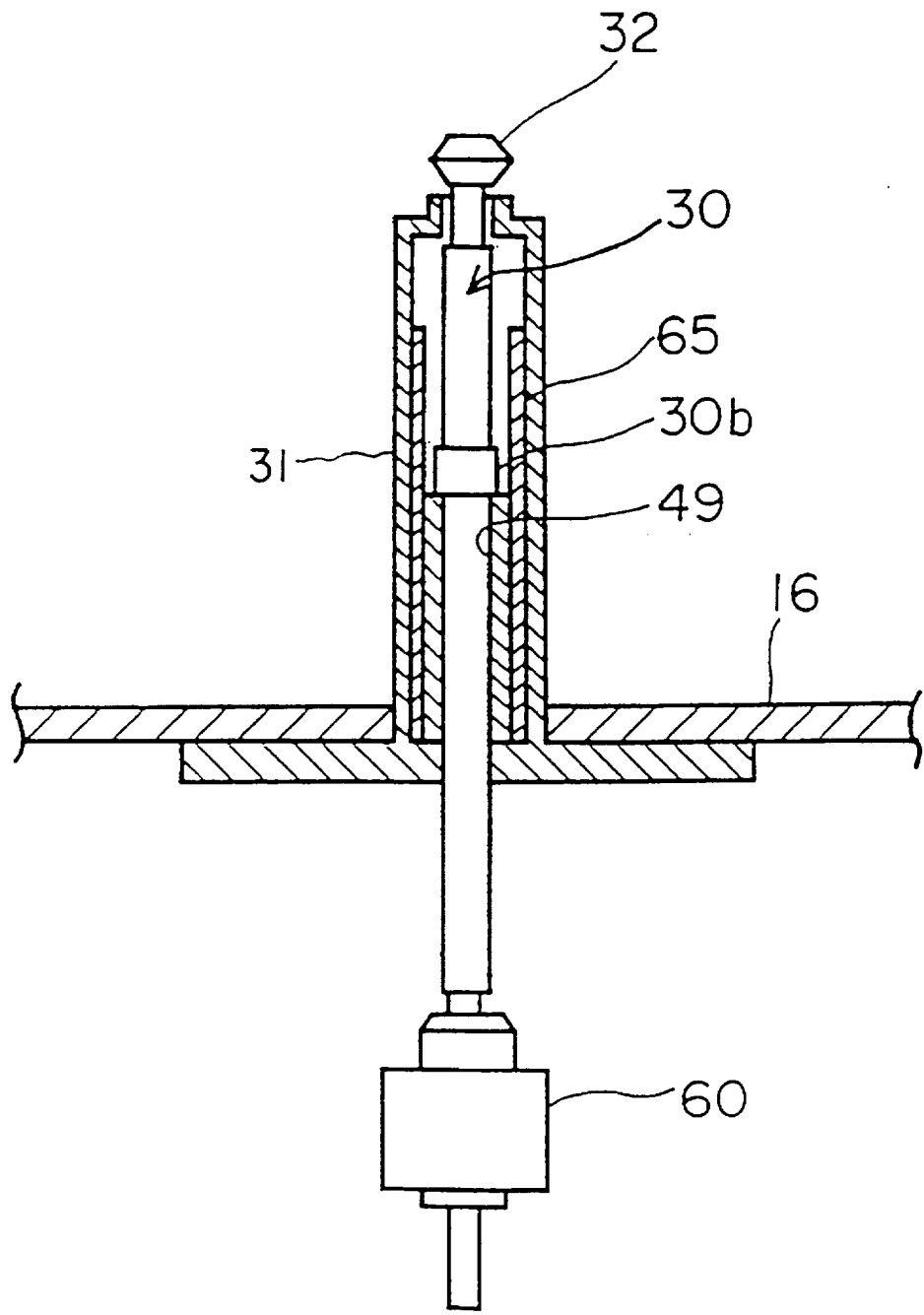
FIG. 14 is a sectional view showing how the stylus and its peripheral parts are positioned.

FIG. 13 is a partially sectional view showing the shape of the stylus 30 with the land 30b, and FIG. 14 is a sectional view illustrating how the stylus 30 and the peripheral parts are positioned.

I-2. Arrangement of Frame Shape Measurement Section

Figure 15:
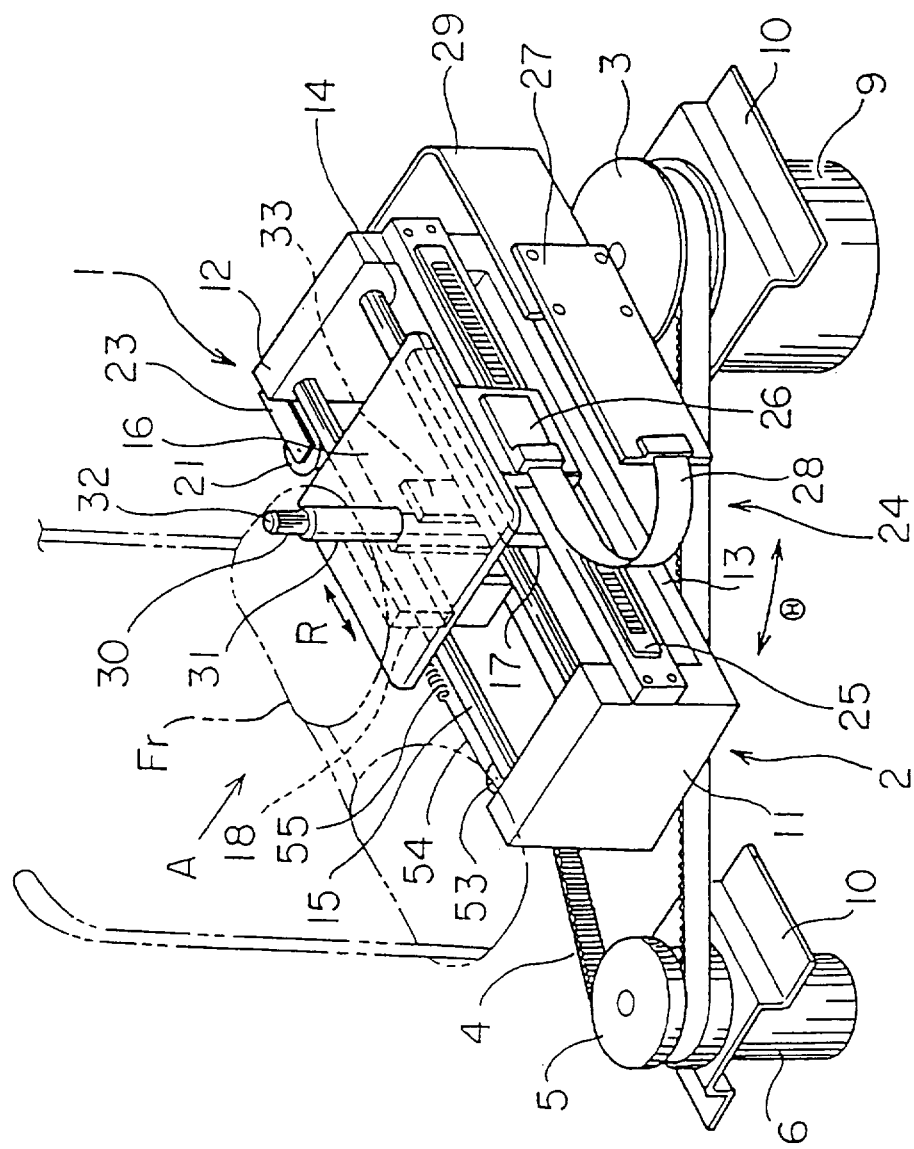
FIG. 15 is a perspective view of a frame shape measurement section.
Figure 16:
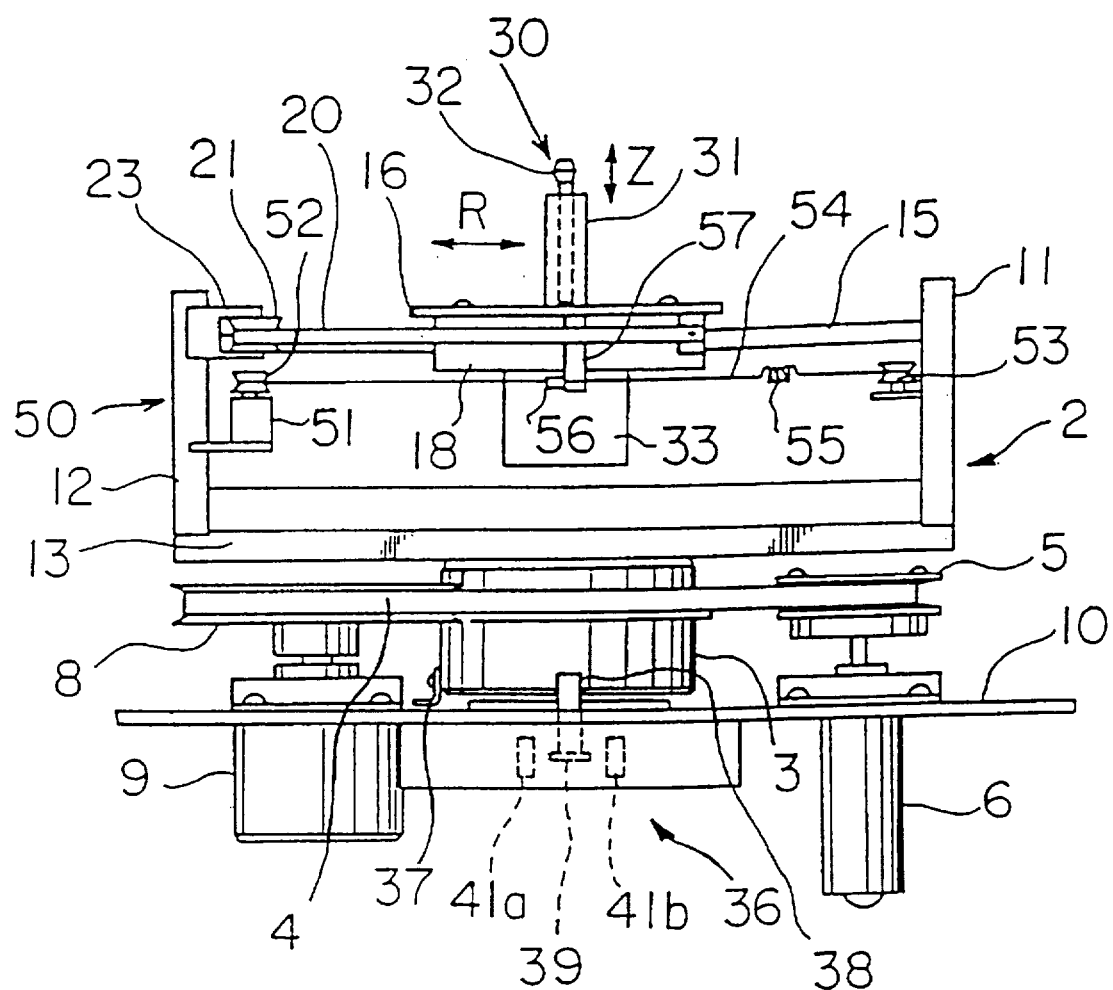
FIG. 16 is a side view of the frame shape measurement section, as viewed from the direction indicated by arrow A in FIG. 15.

FIGS. 15 and 16 illustrate the entire arrangement of the frame shape measurement section, wherein FIG. 15 is a perspective view of the measurement section, and FIG. 16 is a side view of the measurement section, as viewed from the direction indicated by arrow A in FIG. 15. The frame shape measurement section is located below the frame holding section shown in FIG. 3.

The measurement section comprises a measuring unit 1 for measuring the contour of a groove cut in each rim of a frame Fr of spectacles immovably held by the frame holding means at a predetermined position. The measuring unit 1 includes a U-shaped rotary base 2, which is rotated in direction Θ by a motor 6 through a timing pulley 3 attached to the underside of the rotary base 2, a timing belt 4, and a timing pulley 5. The angle of rotation is detected by a rotary encoder 9 connected to the timing belt 4 via the timing pulley 3. The motor 6 and the rotary encoder 9 are fixed to a base plate 10 of the measurement section (FIG. 15 illustrates only part of the base plate 10 for ease of understanding of other parts of the measurement section), and the timing pulley 3 and the rotary base 2 are rotatably supported on the base plate 10 by bearings, not shown.

The rotary base 2 of the measuring unit 1 has two side plates 11 and 12, and a rectangular center plate 13 connecting the side plates to each other. Two parallel slide guide shafts 14 and 15 extend between the side plates 11 and 12, and a slide plate 16 is horizontally positioned on the slide guide shafts 14 and 15 such that it is slidable in direction R along the slide guide shafts 14 and 15. To smoothly guide the slide plate 16, slide guides 17 and 18 having rotatable rollers are attached to the lower side of the slide plate 16. The rollers are arranged on the opposing surfaces of the slide guides 17 and 18 such that the slide guides 17 and 18 hold the slide guide shafts 14 and 15 from outside.

The slide plate 16 is acted upon by the force of a constant force spring 20 in the slide direction R in such a way that the slide plate 16 is pulled toward the side plate 12. As shown in FIG. 16, the constant force spring 20 has one end wound up on a bushing 21, which in turn is fixed to the side plate 12 through a bracket 23. The other end of the constant force spring 20 is attached to a portion of the slide plate 16. The constant force spring 20 serves to always push the stylus against the groove of the frame Fr.

A distance r by which the slide plate 16 is moved in the direction R is measured by a reflection type linear encoder 24 serving as a displacement measurement scale. The linear encoder 24 comprises a scale 25 extending between the side plates 11 and 12 of the rotary base 2, a detector 26 fixed to the slide plate 16 and movable along the scale 25, an amplifier 27, and a flexible cable 28 connecting the amplifier 27 to the detector 26. The amplifier 27 is mounted to a bracket 29 fixed to the side plate 12.

As the slide plate 16 moves, the detector 26 also moves while maintaining a constant distance from the surface of the scale 25, and supplies a pulse signal to the amplifier 27 through the flexible cable 28. The amplifier 27 amplifies the input signal and supplies the resultant signal to a counter, described later.

The stylus 30 serving as a probe is held by the slide plate 16. The stylus 30 is arranged inside the sleeve 31 which is fixed to the slide plate 16 and is supported by the aforementioned cage 49 (see FIGS. 10–12) such that it is rotatable and movable in the vertical direction (Z direction). The stylus 30 has a head 32 having an abacus bead-like shape. The stylus head 32 is fitted in the groove of the frame Fr by the action of the constant force spring 20, and as the rotary base 2 rotates, moves along the groove of the frame Fr.

The stylus 30 moves in the radius direction of the rim of the frame Fr in accordance with the shape of the rim. The distance moved in the radius direction, i.e., the distance r moved in the direction R, is measured by the linear encoder 24 via the sleeve 31 and the slide plate 16, as mentioned above.

The stylus 30 also moves in the direction Z, corresponding to the curve of the frame rim Fr, and the distance moved in the direction Z is measured by a Z-axis measuring device 33 serving as a displacement measurement scale. As shown in FIG. 10, the Z-axis measuring device 33 comprises a charge-coupled device (CCD) line image sensor 34, and a light-emitting diode (LED) 35 as a light source, and is attached to the slide plate 16.

The CCD line image sensor 34 and the LED 35 are arranged such that they face each other. The stylus 30 lifts and lowers at a location between the sensor 34 and the LED 35 in accordance with the curve of the frame rim Fr, and accordingly, also the boundary between the shadow of the stylus 30 and the bright portion, formed on the CCD line image sensor 34 because the stylus 30 intercepts the rays of light from the LED 35, shifts up and down. The CCD line image sensor 34 detects the distance from the end of a measurement plane thereof to the boundary, thereby measuring a displacement z of the stylus 30 in the direction Z. The CCD line image sensor 34 converts the brightness at each point on the measurement plane into a corresponding voltage. Upon receiving an external start pulse, the CCD line image sensor 34 successively outputs voltages based on the brightness at individual points, from the end of the measurement plane in synchronism with externally supplied clock pulses. These voltages are converted into binary signals by a comparator, and the vertical displacement of the stylus 30 is measured by counting the number of clock pulses after the start pulse is generated until the binary signal level changes from "0" to "1," that is, up to the point corresponding to the boundary between the shadow of the stylus and the bright portion.

The measurement section is also provided with a motor rotation-limiting mechanism 36 for stopping the motor 6 after shape measurement, as shown in FIG. 16. This mechanism comprises a rotation limiting L-shaped metal part 37 fixed to the peripheral surface of the timing pulley 3, an interceptive rod 38 extending vertically and actuated by the L-shaped metal part 37, an interceptive plate 39 integral with the interceptive rod 38 and extending horizontally, a pair of springs (not shown) pulling the interceptive plate 39 and the interceptive rod 38 in horizontal opposite directions, thereby movably supporting the members, and photo-interrupters 41a and 41b operable in cooperation with the interceptive plate 39. The photo-interrupters 41a and 41b and the two springs are attached to the base plate 10.

The rotation limiting L-shaped metal part 37 pushes the interceptive rod 38, and a signal is generated when light is intercepted as the interceptive plate 39 passes the photo-interrupters 41a, 41b. When supplied with this signal, a control circuit, described later, stops the motor 6.

Further, as shown in FIG. 16, the measurement section includes an initial R-direction actuating mechanism 50 for moving the stylus 30 in the direction R to a predetermined position (approximately the center of the frame rim) before shape measurement. The mechanism 50 is composed of an R-direction motor 51 comprising a stepping motor fixed to the side plate 12, a pulley 52 mounted on the R-direction motor 51, a pulley 53 attached to the side plate 11, a wire 54 connecting the pulleys 52 and 53, a coil spring 55 and a stopper 56 individually disposed at spaced locations intermediate of the wire 54, and a contact member 57 fixed to the slide plate 16 and always contacting the stopper 56 from the right, as viewed in FIG. 16.

The stopper 56 will be explained in detail. When shape measurement is completed, the stopper 56 is moved to a predetermined origin position near the pulley 53 by the R-direction motor 51 and is held at this position. Accordingly, before a subsequent shape measurement is started, the slide plate 16 is located close to the pulley 52. When supplied with a predetermined number of electric current pulses, the R-direction motor 51 moves the stopper 56 to the left in FIG. 16, and also the contact member 57 moves to the left due to the action of the constant force spring 20. Hence, the slide plate 16 moves to the left. When the slide plate 16 is moved near a predetermined position, the R-direction motor 51 stops, and then the head 32 of the stylus 30 is raised to a predetermined height by the initial Z-direction actuating mechanism 60. Subsequently, the R-direction motor 51 is rotated in the same direction to move the stopper 56 to the left in FIG. 16; therefore, the contact member 57, and accordingly, the slide plate 16, move to the left. As a result, the head 32 of the stylus 30 contacts the rim of the frame Fr fixed beforehand, whereupon the leftward movement of the slide plate 16 and the contact member 57 stops, but the stopper 56 moves further to the left up to a predetermined position at which the current supply to the R-direction motor 51 is stopped.

Then, the shape measurement is carried out. After the shape measurement is completed, the R-direction motor 51 is rotated in the reverse direction to move the stopper 56 to the predetermined origin position near the pulley 53, and the stopper 56 is held at this position, as mentioned above.

Accordingly, the slide plate 16 is held at a position close to the pulley 52.

I-3. Configuration of Control Section

Figure 17:
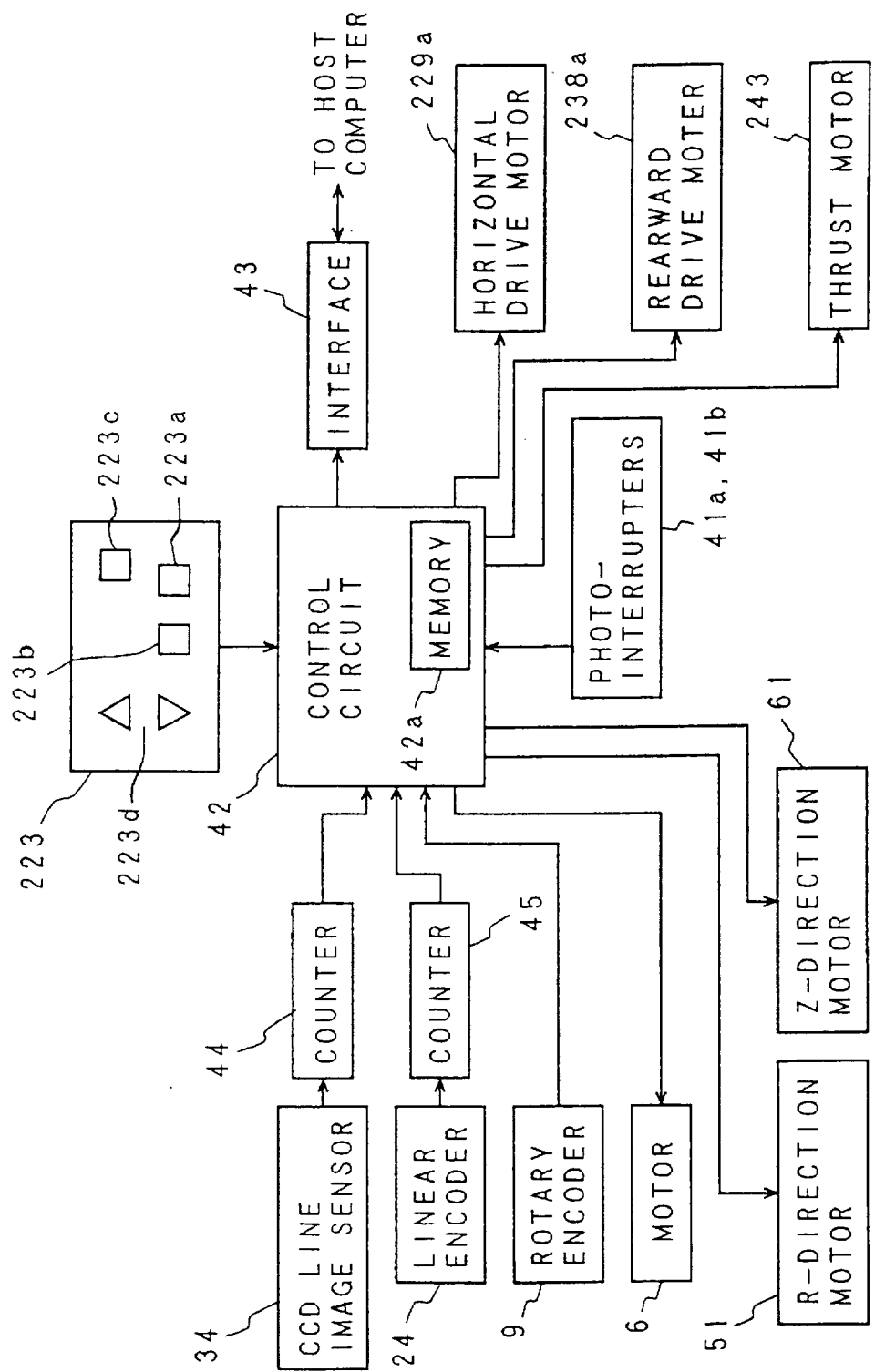
FIG. 17 is a block diagram showing the configuration of a control section for controlling the operation of the frame shape measuring apparatus.

FIG. 17 is a block diagram showing the configuration of the control section for controlling the operation of the frame holding section and frame shape measurement section. A control circuit 42 comprises a microcomputer, and is arranged on a control circuit board housed in the case 202 (FIG. 4).

I-3-1. Control Section Arrangement for Controlling Holding Section

Referring to FIG. 17, the control circuit 42 is supplied with a depression signal from the start button 223a, stop button 223b, clamp button 223c or forward/backward motion button 223d on the panel 223. Based on the depression signal, the control circuit 42 drives the rearward drive motor 238a, thrust motor 243, or horizontal drive motor 229a. The control circuit 42 has a built-in memory 42a, and when supplied with a depression signal from the clamp button 223c, the memory 280a stores the number of signals input thereto.

I-3-2. Control Section Arrangement for Controlling Measurement Section

As shown in FIG. 17, the control circuit 42 is further supplied with the amount of vertical movement of the stylus 30, as displacement z of the stylus 30 in the direction Z, from the CCD line image sensor 34 via a counter 44, as well as the amount of radial movement of the stylus 30, as displacement r of the slide plate 16 in the direction R, from the linear encoder 24 via a counter 45. Also, the amount of rotation of the measuring unit 1 is supplied from the rotary encoder 9 to the control circuit 42 as a rotational angle θ. Upon receiving an origin signal from the rotary encoder 9, the control circuit 42 successively stores, in the memory 42a, the count value associated with the linear encoder 24, i.e., r-axis data, and the count value associated with the CCD line image sensor 34, i.e., z-axis data, both corresponding to an angle signal from the rotary encoder 9. The data θ, r and z are supplied to a computing circuit, not shown, to obtain a three-dimensional figure corresponding to the frame Fr.

The control circuit 42 is also supplied with signals from the photo-interrupters 41a and 41b.

The control circuit 42 supplies drive signals to the Θ-direction drive motor 6, R-direction motor 51, and Z-direction motor 61.

The control circuit 42 is connected to a host computer via an interface 43.

II. Operation of Frame Shape Measuring Apparatus

II-1. Holding Operation of Frame Holding Section

Figure 18:
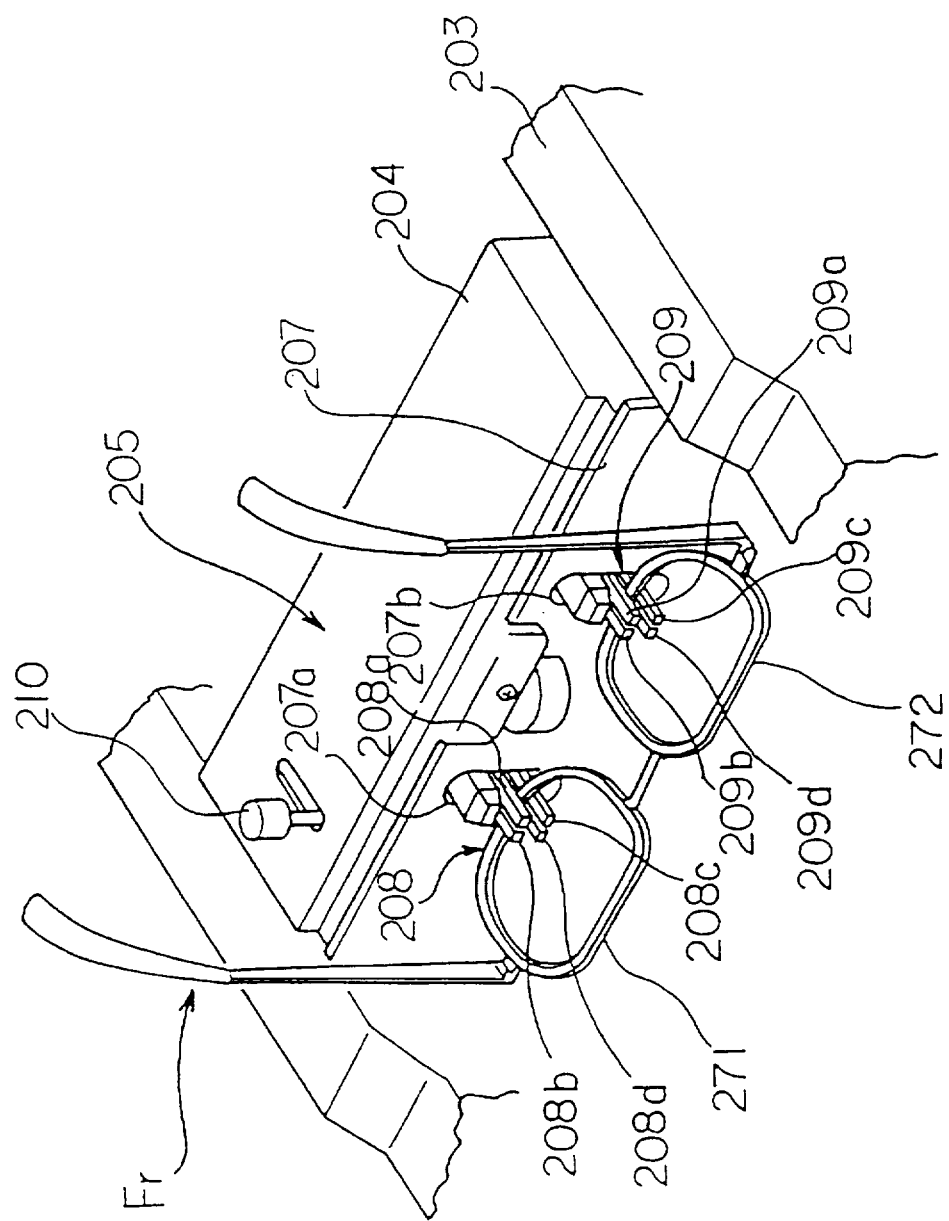
FIG. 18 is a perspective view of the frame shape measuring apparatus, illustrating how a frame of spectacles is held.

FIG. 18 is a perspective view of the frame shape measuring apparatus, illustrating how a frame of spectacles is held. When the button 210 is operated, the clamping members 208a to 208d of the clamping section 208 and the clamping members 209a to 209d of the clamping section 209 open in the vertical direction. With the button 210 held in this manner, the frame Fr is set in the opened clamping sections 208 and 209 such that the lower portions of right and left frame rims 271 and 272 are respectively fitted in the sections 208 and 209, and then the button 210 is released. Consequently, the frame rims 271 and 272 are clamped by the clamping sections 208 and 209, respectively, whereby the frame Fr is held softly.

Subsequently, the rear and front holders 205 and 206 are moved toward each other, to bring the frame holding member 215 into contact with the upper side of the frame Ft.

Figure 19:
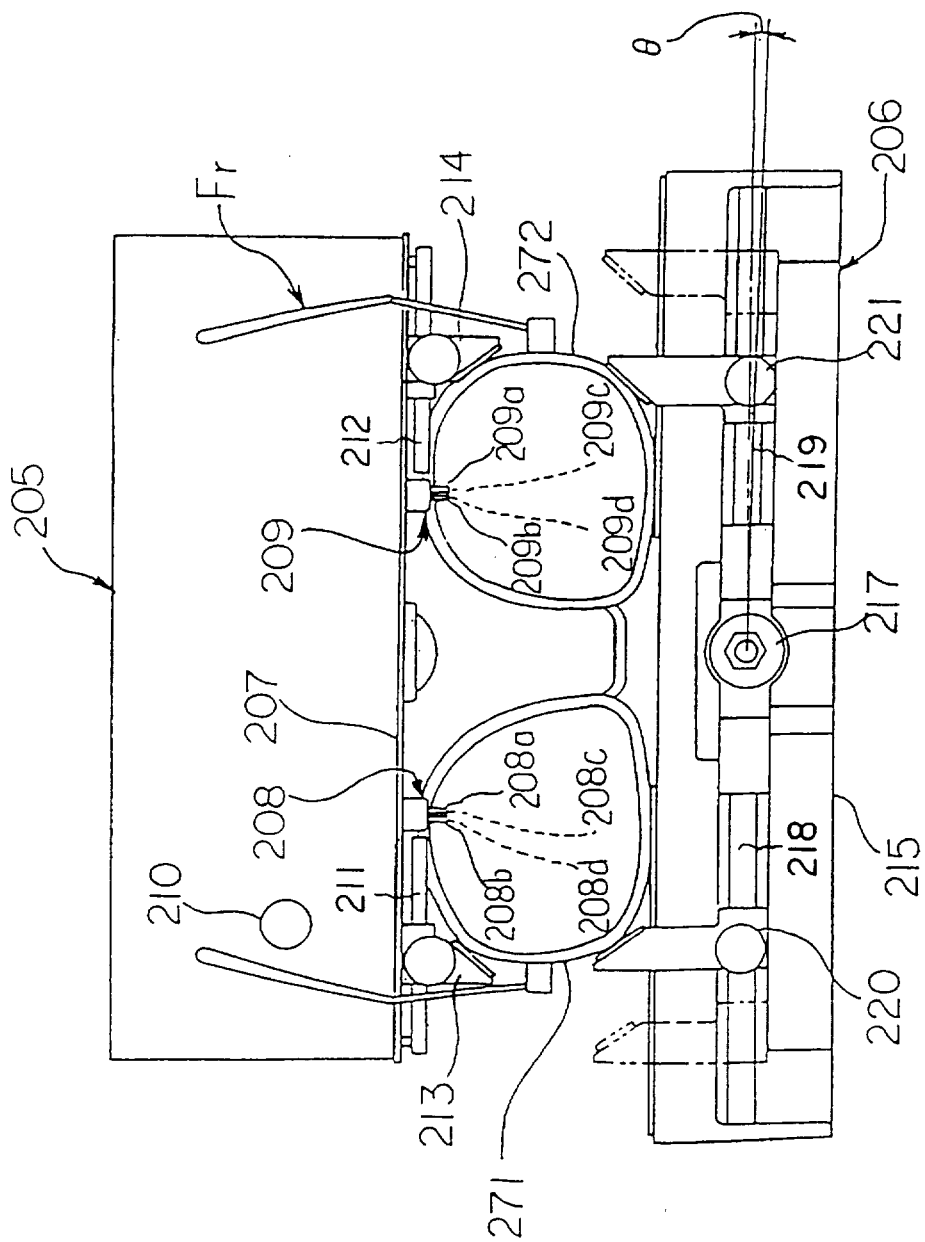
FIG. 19 is a plan view showing a state in which a frame holding member is pushed against an upper portion of a frame.
Figure 20:
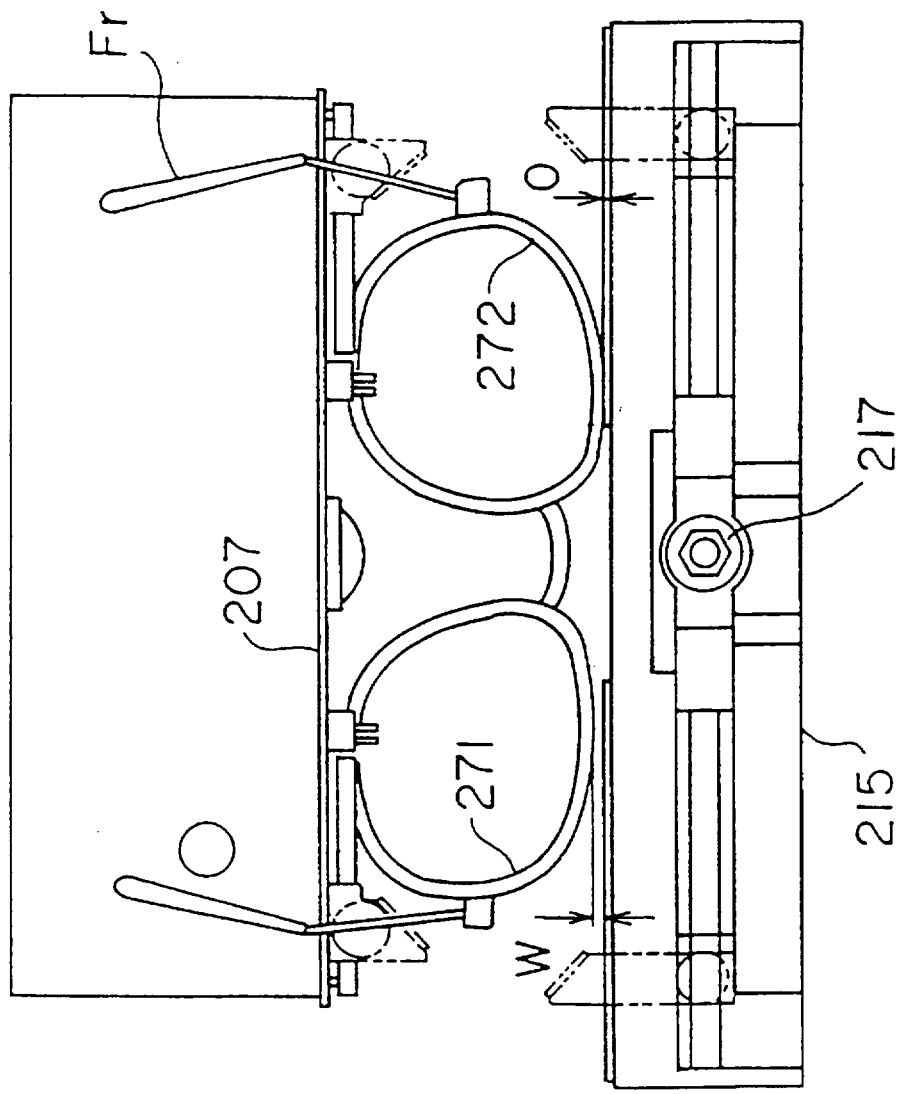
FIG. 20 is a view showing a first state of a frame holding section.
Figure 21:
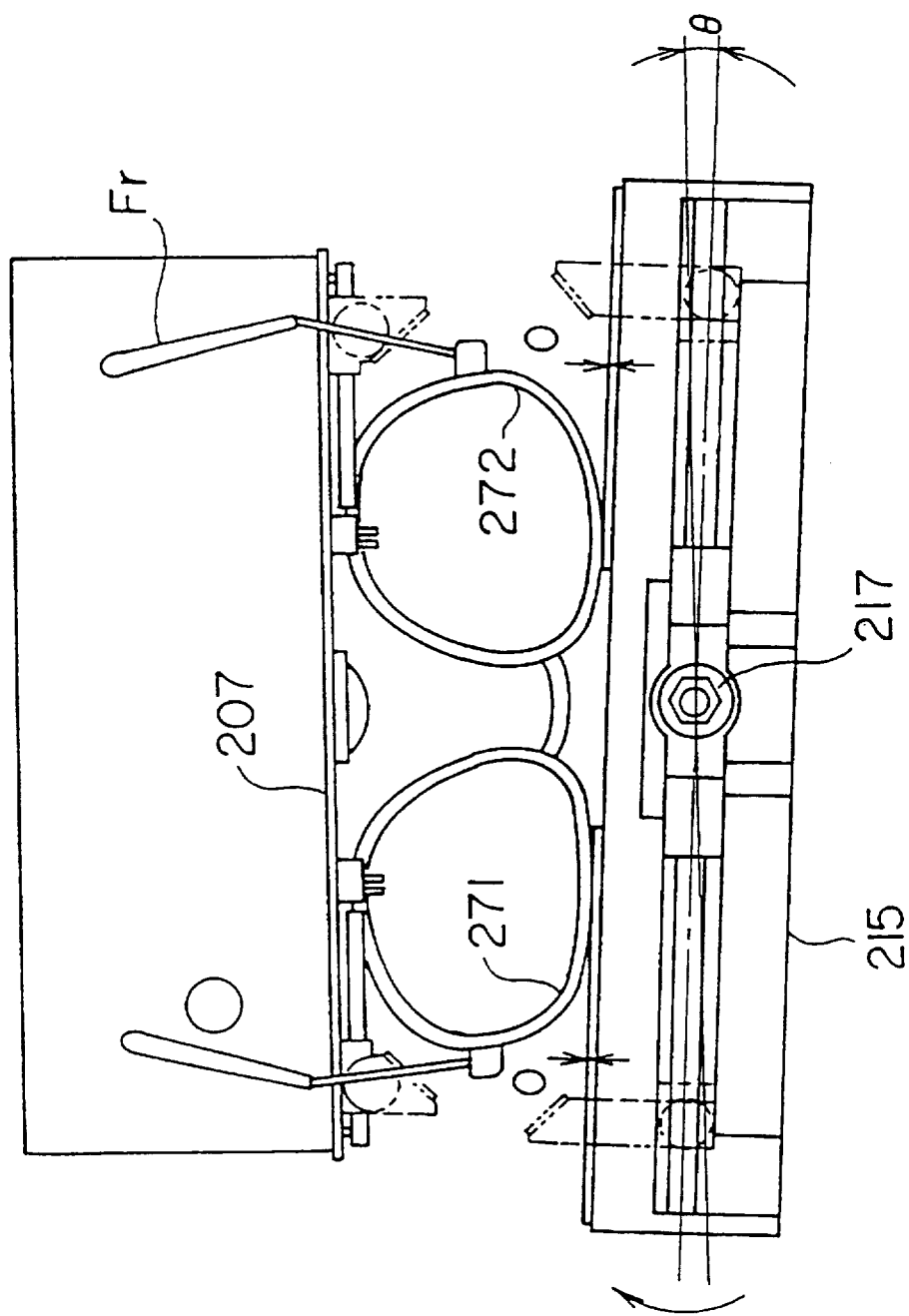
FIG. 21 is a view showing a second state of the frame holding section.

FIG. 19 is a plan view showing a state in which the frame holding member 215 is in contact with the upper side of the frame Fr. In general, right and left rims of frames are slightly different in size. Here, it is assumed that the right rim 271 is smaller in size than the left rim 272 by W, as shown in FIG. 20. When the frame holding member 215 is brought into contact with the frame Fr having such rims, it turns clockwise about the mounting section 217 by a small angle θ with respect to a line parallel to the contact plate 207. Consequently, the frame holding member 215 can be reliably brought into contact with the frame Fr at two points, as shown in FIG. 21.

After the frame Fr is held by the clamping sections 208 and 209 of the rear holder 205 and the frame holding member 215 of the front holder 206, the operator presses the clamp button 223c on the panel 223. Thereupon, the clamping members 208a–208d and 209a–209d of the clamping sections 208 and 209 move rearward by a very small distance. Namely, with the contact plate 207 held in contact with the frame Fr, only the clamping members 208a–208d and 209a–209d are retracted inward of the contact plate 207. The amount of retraction differs depending on the width of the frame rim (the amount of retraction is great in the case of a thick plastic frame, and is small in the case of a thin metal frame), and is adjusted using the clamp button 223c. Accordingly, the stylus 30 is prevented from touching the clamping sections 208 and 209 during measurement of the frame shape. As the clamping sections 208 and 209 retract, the brake mechanism 239 operates to fix the rear and front holders 205 and 206 at positions then assumed. After the retraction is completed, the thrust motor 243 of the front holder 206, shown in FIG. 7, is driven, whereby the frame holding member 215 is fixed at a position then assumed.

While in this state, if the clamp button 223c is depressed again, the clamping members 208a–208d and 209a–209d further retract by the small distance. This is done when the frame Fr clamped is a thin frame such as a metal frame. When the frame Fr requires re-holding, the clamp button 223c is again pressed, whereby the thrust motor 243 rotates in the reverse direction and the frame holding member 215 is released.

After the frame Fr is held by the clamping members 208a–208d and 209a–209d and the frame holding member 215, the auxiliary members 213 and 214 and the auxiliary members 220 and 221 associated with the respective devices are shifted inward, to thereby hold the frame Fr from opposite sides. Thus, the frame holding operation is completed. After this, the start button 223a is pressed, whereupon the horizontal driving unit 229 shown in FIG. 4 operates to move the rear and front holders 205 and 206 to the right, and thus the right rim 271 of the frame Fr is moved to the center of the apparatus for measurement.

II-1-1. Operation of Fitting Stylus in Frame Rim

Figure 22:
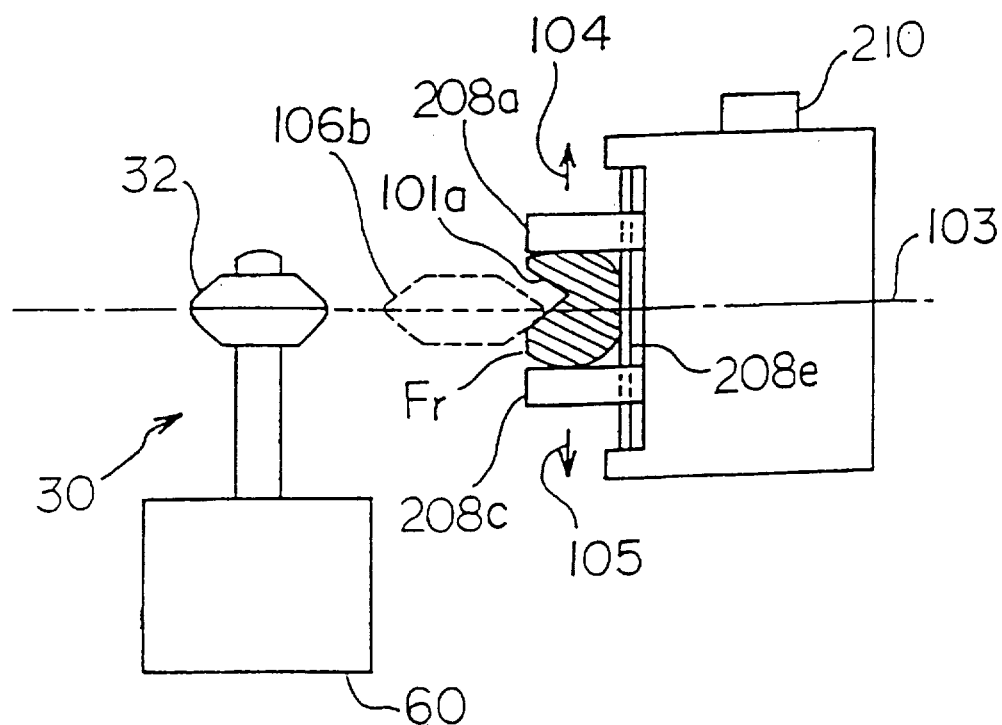
FIG. 22(A) is an elevation of frame holding means of the frame shape measuring apparatus.
FIG. 22(B) is a plan view of the frame holding means of the frame shape measuring apparatus.
Figure 22:
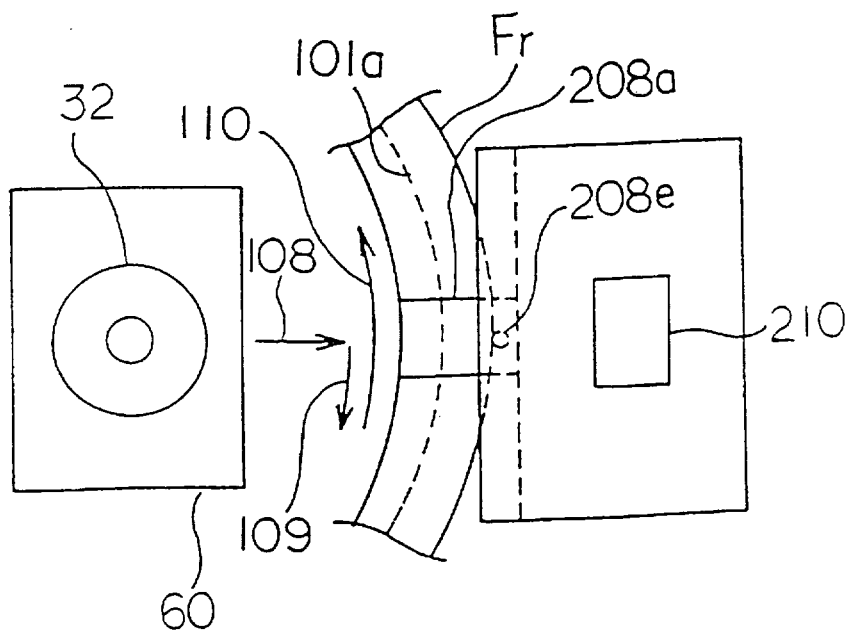

As shown in FIG. 22, the stylus 30 has a head 32 serving as a probe, and is supported by the initial Z-direction actuating mechanism 60. The stylus head 32 has tapered surfaces matching a groove 101a in the rim of the frame Fr and a rounded distal end, and has an abacus bead-like shape. After the frame Fr is held by the frame holding means, the stylus 30 is lifted by the initial Z-direction actuating mechanism 60 such that the head 32 is level with a center line 103 with respect to the thickness (depth) of the frame rim, and is held at this position. Subsequently, the initial Z-direction actuating mechanism 60 moves in the direction of arrow 108, whereby the stylus head 32 contacts a part of the frame rim (at a position indicated by dashed line 106b). In this case, the initial Z-direction actuating mechanism 60 is always acted upon by a biasing force in the direction of arrow 108.

After the stylus head 32 contacts the frame Fr, the force of holding the head 32 at a position level with the center line 103 is released, whereby the head 32 is freely movable in the Z-axis direction. Accordingly, in the case where the frame Fr is designed such that the bottom of the rim groove 101a is not level with the center line 103, the stylus head 32 usually slides into the bottom of the rim groove 101a and the peripheral edge of the head 32 becomes level therewith.

In some cases, however, the stylus head 32 may not slide toward the bottom of the rim groove 101a. Taking such situations into account, the initial Z-direction actuating means 60 then slightly moves the stylus head 32 in a direction (indicated by arrow 109) opposite to the direction in which the stylus head 32 is moved during measurement of the contour of the rim groove 101a. As a result, the head 32 of the stylus 30 moves in the Z-axis direction as the initial Z-direction actuating mechanism 60 moves in the direction of arrow 109, and the edge of the stylus head 32 is brought into contact with the bottom of the rim groove 101a, as described in detail later with reference to FIGS. 26 to 28.

After slightly moving in the direction of arrow 109, the initial Z-direction actuating mechanism 60 moves in the direction for measurement of the contour of the rim groove 101a (the direction of arrow 110, i.e., toward a portion of the frame Fr near the wearer's nose assuming that the frame Fr is worn), to start the measurement of the contour of the rim groove 101a.

II-1-2. Operation of Land of Stylus

After the shape measurement is stopped, the slide plate 16 is moved to a position close to the pulley 53 through operation of the R-direction motor 51, as mentioned before with reference to FIG. 16. Since the reaction force acting on the stylus head 32 from the frame Fr in a direction perpendicular to the axial direction no longer exists, the column portion of the stylus 30 and the cage 49 are released from close contact with each other, and a slip is allowed between the two members. In this case, if the cage 49 sticks to the outer cylinder 65 due to viscosity of lubricating oil, the stylus 30 alone may slide relative to the cage 49 and descend by its own weight. While the stylus 30 descends in this manner, the lower end of the land 30b strikes on the upper end of the cage 49, thereby pushing the cage 49 down to the position illustrated in FIG. 14.

Thus, since the cage 49 is located at the predetermined lowest position when measurement is started again, the cage 49 never hinders the lifting motion of the stylus 30, making it possible to position the head 32 of the stylus 30 accurately at the rim groove of the frame Fr.

In the above embodiment, the rim groove of the frame Fr is traced with the head 32 of the stylus 30. Alternatively, the outer periphery of a frame template may be traced by means of the recess 30c of the stylus 30 shown in FIG. 13.

As mentioned above, the land 30b of the stylus 30 strikes on the upper end of the cage 49 and thereby pushes down the cage 49. Accordingly, even if the cage 49 sticks to the outer cylinder 65 due to viscosity of lubricant oil and does not descend by itself, the cage 49 can be prevented from being left at a raised position. When measurement is carried out again, therefore, the head 32 or recess 30c of the stylus 30 can be accurately positioned at the rim groove of the frame Fr or the outer periphery of the frame template, thus permitting accurate shape measurement.

II-2. Hold Control Procedure for Frame Holding Section

Figure 23:
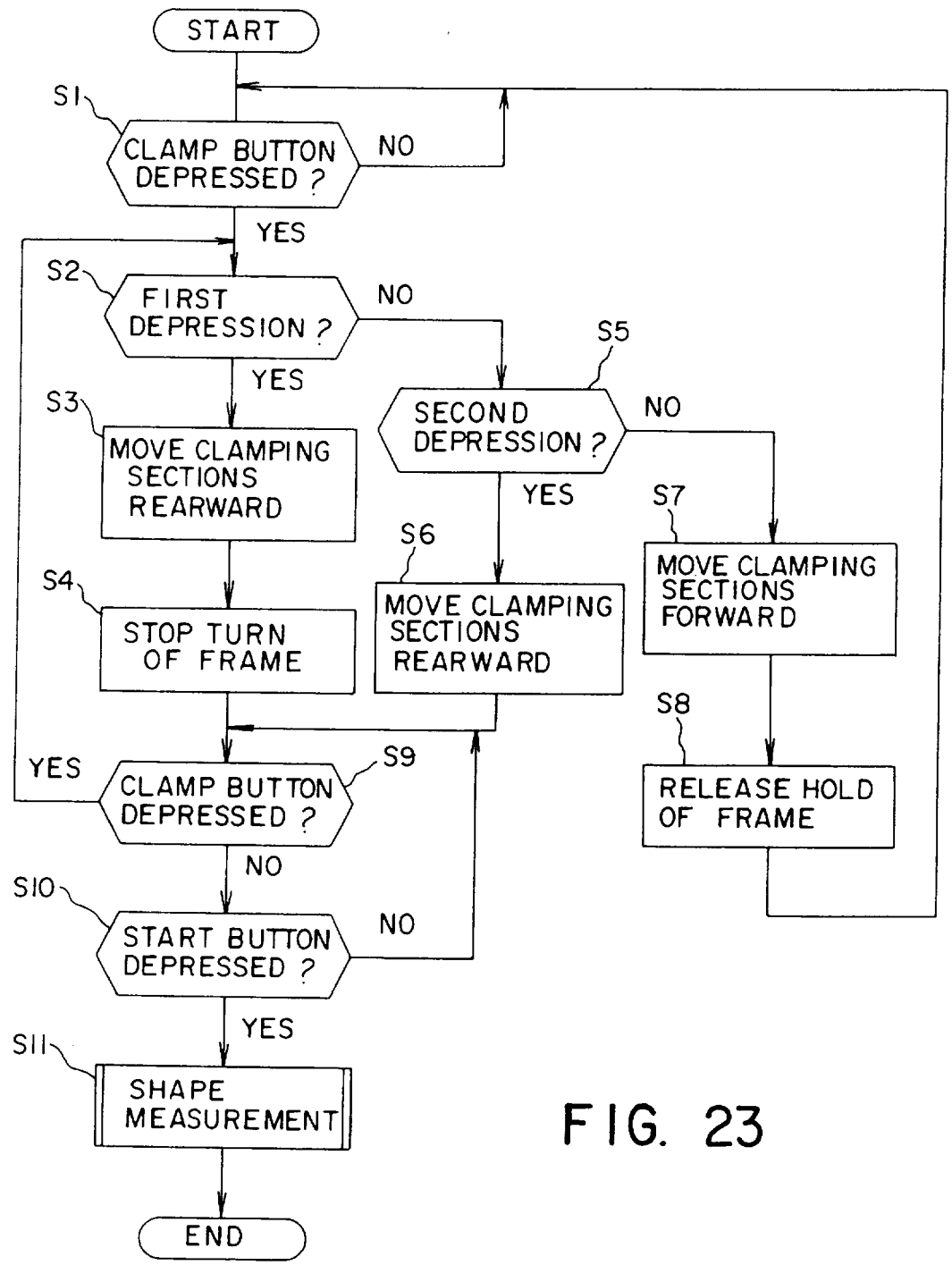
FIG. 23 is a flow chart of a frame holding process executed by a control circuit.

FIG. 23 is a flow chart of a frame holding process executed by the control circuit 42 (FIG. 17).

[S1] It is determined whether the clamp button 223c on the panel 223 is depressed. If the button 223c is depressed, the flow proceeds to Step S2, and if not, Step S1 is repeatedly executed.

[S2] Based on the data stored in the memory 42a, it is determined whether the clamp button 223c is depressed for the first time after resetting. If the button 223c is depressed for the first time, the flow proceeds to Step S3, and if not, the flow proceeds to Step S5.

[S3] The rearward drive motor 238a is driven to move the clamping sections 208 and 209 rearward by one step.

[S4] Simultaneously with the rearward movement in Step S3, the thrust motor 243 is driven to stop the turning motion of the frame holding member 215.

[S5] Based on the data stored in the memory 42a, it is determined whether the depression of the clamp button 223c is a second depression after the resetting. If the button 223c is depressed once before, the flow proceeds to Step S6, and if not (the current depression is a third depression), the flow proceeds to Step S7.

[S6] The rearward drive motor 238a is driven to move the clamping sections 208 and 209 rearward by one further step.

[S7] The rearward drive motor 238a is driven in the reverse direction to move the clamping sections 208 and 209 forward to the original position, i.e., the position assumed before the start of setting.

[S8] The thrust motor 243 is driven in the reverse direction to release the hold of the frame holding member 215.

[S9] It is determined whether the clamp button 223c is depressed. If the button 223c is depressed, the flow proceeds to Step S2, and if not, the flow proceeds to Step S10.

[S10] It is determined whether the start button 223a is depressed. If the button 223a is depressed, the flow proceeds to Step S11, and if not, the flow returns to Step S9.

[S11] The horizontal drive motor 229a is driven to move the right rim 271 of the frame Fr to the center of the apparatus, and then the shape of the right rim 271 is measured with the stylus 30. The measurement procedure will be described in detail later with reference to FIG. 24. After the shape of the right rim 271 is measured by means of the stylus 30, the horizontal drive motor 229a is again driven to now move the left rim 272 to the center of the apparatus, followed by similar measurement of the shape of the left rim 272. The data obtained by the shape measurement is stored in the memory 40a of the control circuit 40.

If, during the measurement of the frame shape, the stop button 223b is pressed, the control circuit 40 immediately stops the measurement.

Since the frame holding member 215 is swingable in a horizontal plane as mentioned above, it can touch the frame Fr at two points without fail, even if the frame Fr to be measured has right and left rims of different sizes or shapes. Accordingly, the frame Fr need not be firmly clamped by the rear and front holders 205 and 206, and yet can be held reliably. Thus, the frame Fr can be held without the possibility of being deformed, and accurate frame shape measurement can be implemented.

Although in the above embodiment, the frame holding member 215 of the front holder 206 is horizontally swingable, the rear holder 205 may alternatively be designed to be horizontally swingable.

As described above, at least one of the two holding members is swingable in a plane substantially parallel to the plane of the frame rim, and the swinging motion can be stopped by the stopper mechanism. Accordingly, even a frame whose right and left frame rims are different in size can be reliably held, without requiring a large force, and the frame shape can be accurately measured without deforming the frame.

II-3. Measurement Control Procedure for Frame Shape Measurement Section

Figure 24:
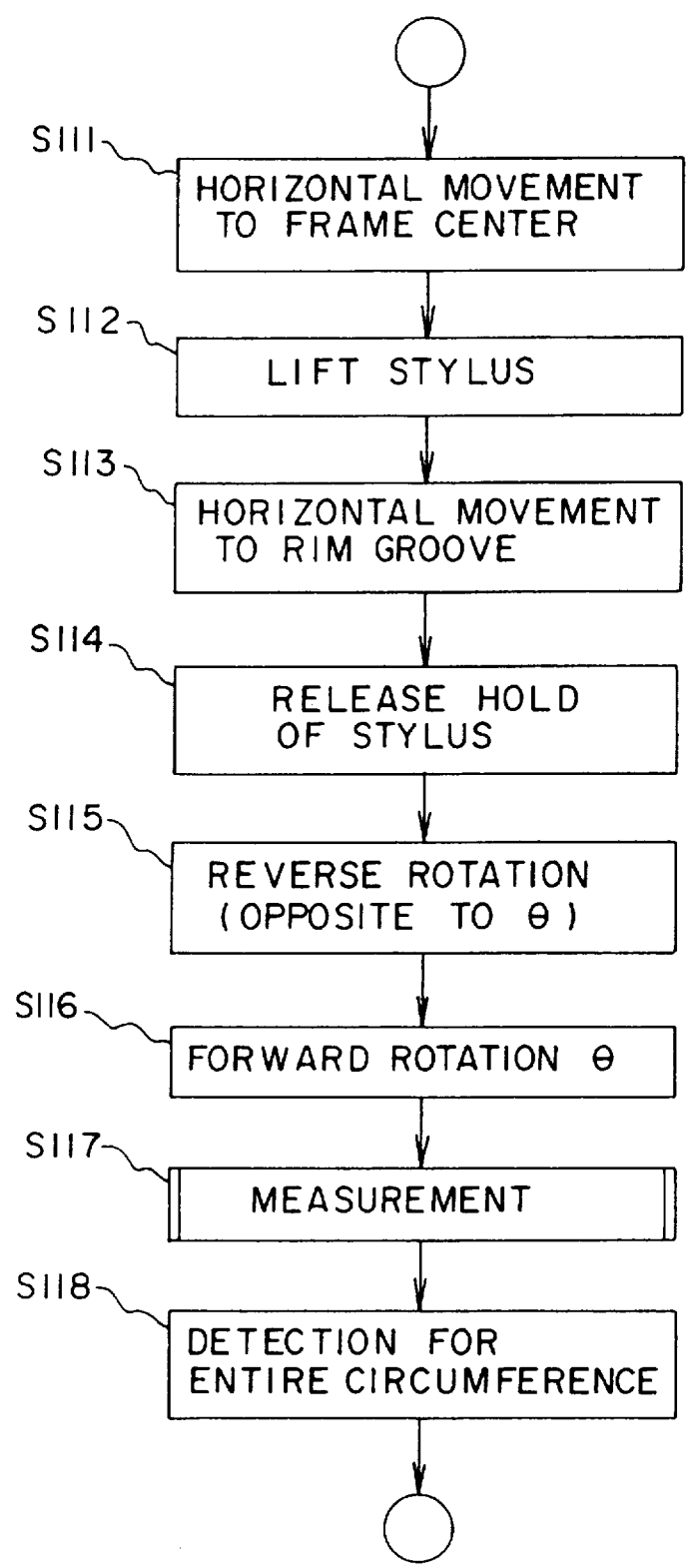
FIG. 24 is a flow chart showing details of Step S11 in FIG. 23.

FIG. 24 is a flow chart showing details of Step S11 in FIG. 23, i.e., the frame shape measurement process. Only the shape measurement process for one of the frame rims will be explained with reference to the flow chart.

[S111] The R-direction motor 51 is rotated, whereby the stylus 30, which is then located at the origin position near the pulley 53, is horizontally moved to approximately the center of one rim of the frame Fr via the stopper 56, contact member 57, slide plate 16, etc. Then, the R-direction motor 51 is stopped.

[S112] Subsequently, the Z-direction motor 61 is rotated to thereby lift the thrust shaft 63, i.e., the stylus 30, and when the head 32 of the stylus 30 reaches a predetermined position along the Z axis, rotation of the Z-direction motor 61 is stopped and the thrust shaft 63 is held at this position. At this time, the thrust shaft 63 is freely movable in the upward direction. The predetermined position along the Z axis represents the position level with the center line 103 shown in FIG. 22.

[S113] The R-direction motor 51 is further rotated in the same direction as in Step S111 to move the stopper 56 to the predetermined position, and then the R-direction motor 51 is stopped. In this case, the contact member 57 follows the stopper 56 due to the effect of the constant force spring 20, but after the head 32 of the stylus 30 contacts the frame Fr, the member 57 no longer follows the stopper 56. Namely, the contact member 57, slide plate 16, etc. stop their movement after the stylus head 32 contacts the frame Fr. In this contact state, the head 32 of the stylus 30 is pressed against the frame Fr with the horizontal force exerted by the constant force spring 20.

At this time, downward movement of the stylus 30 in the Z-axis direction is inhibited by the thrust shaft 63, but the stylus 30 can freely move in the upward direction. Accordingly, even in the case where the stylus head 32 contacts a lower inclined surface Fr1 of the groove of the frame Fr and the peripheral edge of the stylus head 32 fails to be fitted in the bottom of the groove (as in the type of frame Fr in which the rim groove is formed slightly upward with respect to the frame), as shown in FIG. 25(A), the stylus head 32 slides to the upper left, as viewed in the figure, along the lower inclined surface Fr1 of the groove, due to the force with which the stylus head 32 is horizontally pressed against the frame Fr, and the stylus head 32 finally becomes fitted in the bottom of the rim groove, as indicated by dashed line 32a.

[S114] The Z-direction motor 61 is rotated in the direction opposite to the rotating direction in Step S112, whereby the thrust shaft 63 lowers, and upon detection of an ON signal from the origin sensor 64, the Z-direction motor 61 is stopped.

Thus, since the stylus 30 is no longer supported on the thrust shaft 63, it can now freely move downward in the Z-axis direction. Accordingly, even in the case where the stylus head 32 contacts an upper inclined surface Fr2 of the groove of the frame Fr and the peripheral edge of the stylus head 32 fails to be fitted in the bottom of the groove (as in the type of frame Fr in which the rim groove is formed slightly downward with respect to the frame), as shown in FIG. 25(B), the stylus head 32 slides to the lower left, as viewed in the figure, along the upper inclined surface Fr2 of the groove, due to its own weight and the force with which the stylus head 32 is horizontally pressed against the frame Fr, and the stylus head 32 finally becomes fitted in the bottom of the rim groove, as indicated by dashed line 32b.

In this manner, in cases where the head 32 of the stylus 30 is initially off the bottom of the rim groove of the frame Fr but at least contacts one of the inclined surfaces of the rim groove, the stylus head 32 slides along the inclined surface of the rim groove and the edge thereof can be brought to the bottom of the rim groove, in Steps S113 and S114, by the horizontal force exerted by the constant force spring 20. In some cases, however, the edge of the stylus head 32 cannot be fitted in the bottom of the rim groove, for example, when the force of friction is too large though the stylus head 32 is in contact with the inclined surface of the groove, or when the stylus head 32 is pressed against a portion of the rim other than the inclined surfaces. This problem can be solved by the subsequent step.

[S115] The motor 6 is rotated such that the stylus 30 moves in a direction opposite to the measurement direction Θ (i.e., toward a portion of the frame close to the wearer's ear assuming that the frame is worn, as mentioned later). Then, the rotation limiting L-shaped metal part 37 pushes the interceptive rod 38, and when the interceptive plate 39 intercepts the light falling on the photo-interrupter 41a or 41b, the rotation of the motor 6 is stopped in response to a signal generated upon the interception of the light. Owing to the movement of the stylus 30 in the direction opposite to the measurement direction Θ, a slip is allowed between the stylus head 32 and the rim groove even in the case where the force of friction is so great that the stylus head 32 cannot slide toward the bottom of the rim groove, though the head 32 is in contact with the inclined surface of the groove, and the edge of the stylus head 32 can finally be brought into contact with the bottom of the rim groove even in the case where the stylus head 32 is pressed against a portion of the rim other than the inclined surfaces of the groove. The latter case will be explained with reference to FIGS. 26 to 28.

Figure 26:
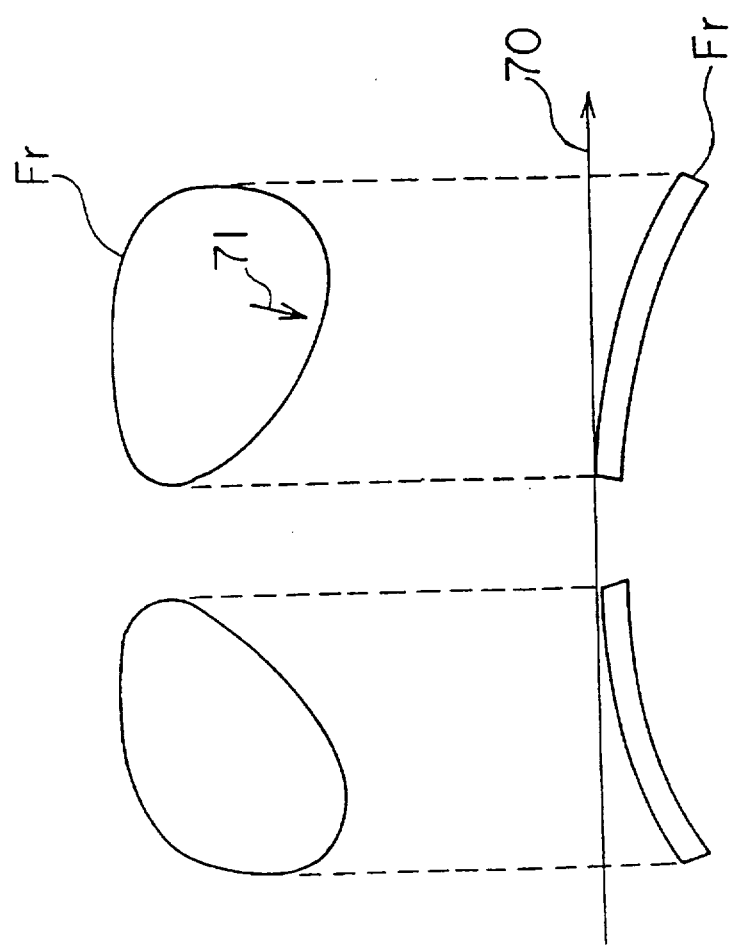
FIG. 26 is a diagram showing the shape of a frame.

FIG. 26 illustrates shapes of frame rims, wherein the upper part is a front view of the frame rims and the lower part is a bottom view of the same. As illustrated, the right and left rims of a frame Fr are generally inclined with respect to the direction 70 of a plane of spectacles and are each curved along the wearer's face.

Figure 27:
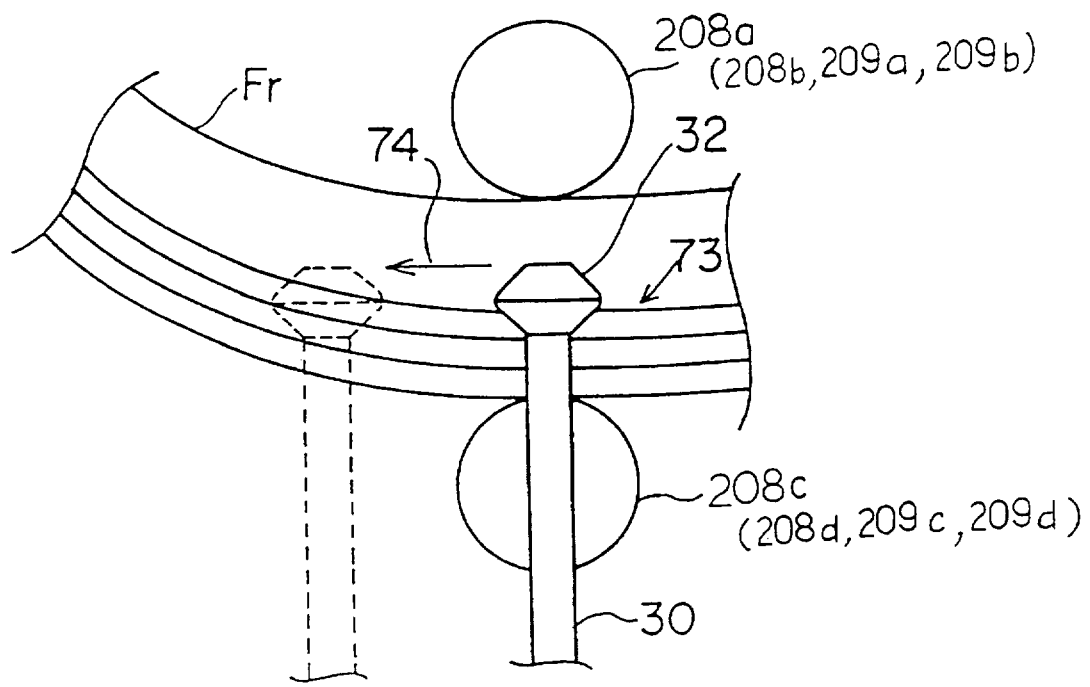
FIG. 27 is a view of part of the frame, as viewed from the direction indicated by arrow 71 in FIG. 26.

FIG. 27 shows part of the frame Fr as viewed from the direction indicated by arrow 71 in FIG. 26, wherein the right and left sides correspond, respectively, to the nose side and ear side of the frame, and the lower and upper sides correspond, respectively, to the front and rear sides of spectacles. Since the frame rim is curved as mentioned above, the rim illustrated in FIG. 27 gradually curves upward with distance toward the left (toward the ear side of the frame).

In general, frames of spectacles are designed such that the greater the frame width (the thicker the rim), the more forward the rim groove is located for better appearance. Namely, as shown in FIG. 27, the rim groove 73 is located lower than the center of the frame rim. The frame Fr is held by being clamped by the clamping members 208a–208d and 209a–209d of the holding section from above and below, and the head 32 of the stylus 30 is pressed against the frame Fr at a location between the clamping member 208a (208b, 209a, 209b) and the corresponding clamping member 208c (208d, 209c, 209d). Accordingly, if the frame width (rim thickness) is large and if the head 32 of the stylus 32 is pressed against a portion of the frame Fr other than the rim groove 73, the stylus head 32 cannot fail to be located at a portion rearward of the rim groove 73 (upward in FIG. 27).

Taking account of the curve of the frame rim and the position of the stylus head assumed when the frame width (rim thickness) is large, the stylus 30 is moved horizontally toward the ear side of the frame Fr (arrow 74), i.e., in the direction opposite to the measurement direction Θ, whereby the head 32 of the stylus 30 can be reliably fitted in the rim groove 73, as indicated by the dashed line. The stylus 30 is, at this time, freely movable in the Z-axis direction. Thus, if even a portion of the head 32 engages the rim groove 73, the peripheral edge of the stylus head 32 is brought to the bottom of the rim groove 73 due to the effect of the inclined surface of the groove 73 and the biasing force of the constant force spring 20.

[S116] The motor 6 is rotated in the direction opposite to the rotating direction in Step S115 (toward the nose side of the frame Fr), whereby the stylus 30 moves along the frame rim in the measurement direction Θ while rotating and contacting the rim groove.

Figure 28:
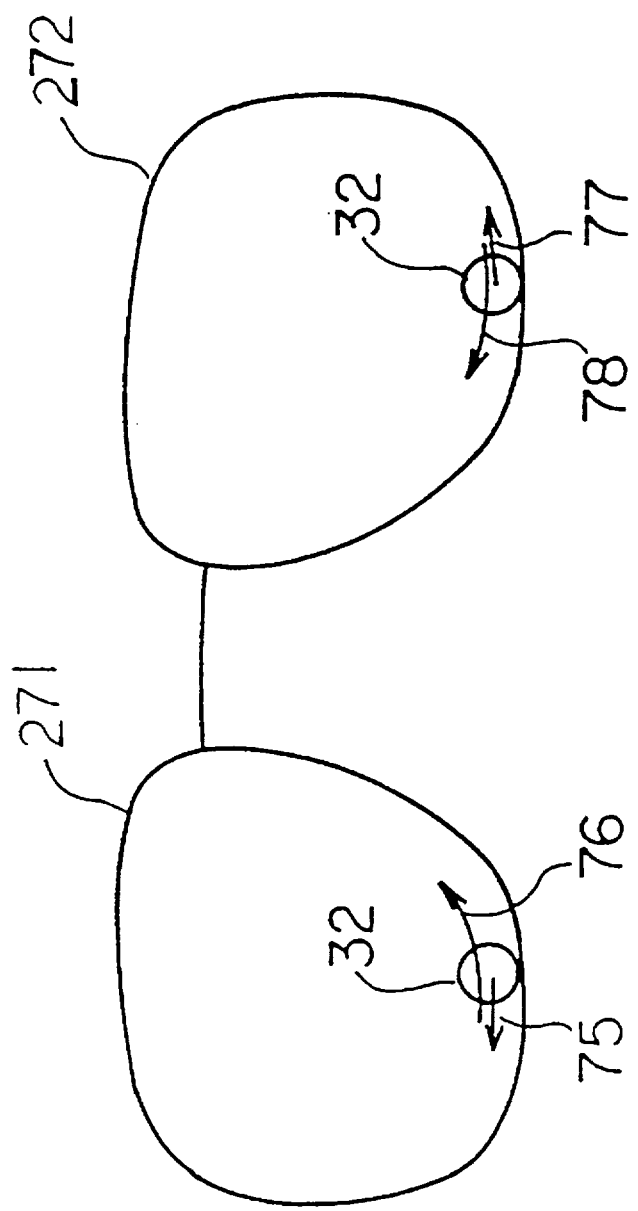
FIG. 28 is a front view of a frame, illustrating movement of the stylus head.

FIG. 28 is a front view of the frame, illustrating the movements of the head 32 of the stylus 30 in Steps S115 and S116. As illustrated, in the case of the right rim 271 of the frame Fr, the stylus head 32 is first moved toward the ear side of the frame along the rim groove (arrow 75), and then is moved toward the nose side (arrow 76) to start the measurement. Similarly, in the case of the left rim 272, the stylus head 32 is first moved toward the ear side of the frame along the rim groove (arrow and then is moved toward the nose side (arrow 78) to start the measurement.

[S117] After the stylus 30 reaches a measurement start position, measurement of the contour of the rim groove of the frame Fr is started. The amount of movement of the stylus 30 in the radius direction is detected by the linear encoder 24 as the displacement r of the slide plate 16 in the direction R, and the amount of movement of the stylus 30 in the vertical direction is detected by the CCD line image sensor 34 as the displacement z of the stylus 30 in the direction Z. In this case, upon receiving the origin signal from the rotary encoder 9, the control circuit 42 successively stores, in the memory 42a, the count value r (R-axis data) associated with the linear encoder 24 and the count value z (Z-axis data) associated with the CCD line image sensor 34, corresponding to the angle signal θ from the rotary encoder 9. Based on the data θ, r and z, the three-dimensional shape of the frame Fr is acquired.

[S118] After the rotary table 2 makes one rotation, the rotation limiting L-shaped metal part 37 pushes the interceptive rod 38 and the interceptive plate 39 intercepts the light incident on the photo-interrupter 41a or 41b, whereupon the motor 6 stops and the measurement of Step S117 is stopped.

The stylus head of the above embodiment has an abacus bead-like shape with a roundish distal end, but it may be of any other shape as long as it includes a portion matching the inclined surfaces (tapered surfaces) of the rim groove of a frame. For example, the stylus head may have a trapezoidal, circular or elliptic cross section.

As described above, the head 32 of the stylus 30, which has been automatically located at the predetermined position of the frame Fr, is once moved in the direction opposite to the regular measurement direction along the rim groove, before the start of measurement. At this time, the stylus 30 is movable in the Z-axis direction. Accordingly, even if the stylus head 32 is then off the rim groove, it never fails to be fitted in the rim groove and the measurement edge thereof is brought into close contact with the bottom of the groove. Subsequently, the stylus 30 is moved in the regular direction, and shape measurement is started at the initial position. In this manner, at the start of the measurement, the head 32 of the stylus 30 can be accurately pressed against the rim groove of the frame Fr.

The head 32 of the stylus 30 held at the predetermined vertical origin position is horizontally moved toward the frame Fr, is pressed against the frame Fr with a predetermined force, and then the force of holding the stylus head 32 at the vertical origin position is released. This operation permits the stylus head 32 to slide along the inclined surface of the rim groove of the frame Fr, whereby the stylus head 32 can be accurately fitted in the rim groove of the frame Fr when the measurement is started.

II-3-1. Supplementary Explanation of Stylus Operation

The following is a supplementary explanation of the operation of the stylus, whose arrangement is described with reference to FIGS. 11 and 12, in relation to the shape measurement process described above.

AS the Z-direction motor 61 rotates, the thrust shaft 63 lifts; therefore, also the stylus 30 lifts and the head 32 thereof reaches the predetermined position along the Z axis. In this case, the cage 49 also lifts from its lowest position by an amount half the lift amount of the stylus 30. When rotation of the Z-direction motor 61 is stopped, the stylus 30 and the cage 49 remain at their respective lifted positions (Step S112).

Subsequently, the Z-direction motor 61 rotates in the reverse direction, whereby the thrust shaft 63 descends, and upon generation of an ON signal by the origin sensor 64, the rotation of the motor 61 is stopped. In this case, since the head 32 of the stylus 30 is pressed against the frame Fr and receives the reaction force in a direction perpendicular to the axis thereof, the stylus 30 is slightly inclined with respect to the lengthwise direction of the cage 49. Accordingly, the column portion of the stylus 30 partially closely contacts the cage 49, and no slip is allowed between these two members. As a result, when the thrust shaft 63 descends, the cage 49 remains at the lifted position (Step 114).

When the shape measurement is carried out thereafter or when the stylus 30 is moved in the direction opposite to the measurement direction Θ, it is necessary that the head 32 of the stylus 30 smoothly move in the direction Z, following the contour of the rim groove of the frame Fr. Since the cage 49 remains at the lifted position as mentioned above, it can move downward. Namely, when the stylus 30 descends, the cage 49 lowers by an amount just half the amount by which the stylus 30 descends, and thus the cage 49 does not adversely affect the downward movement of the stylus 30. Consequently, the stylus 30 is allowed to smoothly move in the vertical direction, thus making it possible to accurately detect values representing the location in the Z-axis direction.

In the foregoing embodiment, the hole 30a is formed in the lower end face of the stylus 30, but the stylus 30 may alternatively be configured such that a conical surface projects from the lower end face coaxially therewith.

As mentioned above, the thrust shaft 63 and the lower end face of the stylus 30 are positioned such that the stylus 30 is pushed up at a location eccentric with respect to the axis thereof. With this arrangement, no slip is allowed between the stylus 30 and the cage 49, and when the stylus 30 is lifted, also the cage 49 lifts by an amount exactly half the lift amount of the stylus 30. Accordingly, when shape measurement is carried out thereafter, the cage 49 itself can descend, thus allowing the stylus 30 to move downward. As a result, the stylus head 32 is allowed to smoothly move in the vertical direction, making it possible to carry out the shape measurement with accuracy.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An apparatus for measuring shape of a frame of spectacles, in which the shape of the frame is measured with a measuring element which is held in contact with a groove in a rim of the frame while being moved along the groove, the apparatus comprising:

holding means for holding the frame at a predetermined hold position;

measuring element actuating means for moving the measuring element to a predetermined horizontal origin position with respect to the right and left rims of the frame, for moving the measuring element to a predetermined verticle origin position in a Z-axis direction parallel to an axis of the measuring element, and for holding the measuring element at the predetermined vertical origin position;

positioning means including first moving means for positioning the measuring element at a measurement position by moving the measuring element, held at the predetermined vertical origin position, horizontally toward the frame and pressing the measuring element against the frame with a biasing force; and control means for controlling said measuring element actuating means and said positioning means for automatic and sequential movement.

2. The apparatus according to claim 1, wherein said positioning means includes second moving means for moving the measuring element in the Z-axis direction after the measuring element is pressed against the frame with the biasing force.

3. The apparatus according to claim 2, wherein said positioning means includes means for moving the measuring element after the measuring element is pressed against the frame with the biasing force, first in a direction opposite to a measurement, direction, and then again pressing the measuring element against the frame.

4. The apparatus according to claim 1, wherein said holding means includes:

two holding members capable of contacting upper and lower portions, respectively, of the frame to thereby hold the frame, at least one of the two holding members having a contact surface for pressing the frame therebetween;

a turning mechanism for turning said at least one holding member substantially parallel to a plane of the frame rim, to thereby adjust a contact angle between said at least one holding member and the frame; and a stopper mechanism for stopping the turning motion of said at least one holding member after the contact angle is adjusted by the turning mechanism.

5. The apparatus according to claim 4, wherein the other of said two holding members includes at least four clamping members for clamping each of the right and left rims of the frame therebetween in a thickness direction of the rim, to thereby hold the rims from front and back of the frame.

6. The apparatus according to claim 5, wherein said holding means includes actuating means for moving the four clamping members in a direction parallel to the plane of the frame rim away from the frame up to a position such that individual ends of the four clamping members do not project inside of the frame rim.

7. The apparatus according to claim 1, wherein said measuring element actuating means includes:

a movable table movable in a direction prependicular to the axis of the measuring element;

an outer cylinder mounted on the movable table, for guiding the measuring element in an axial direction thereof;

a measuring element supporting shaft extending through the outer cylinder form the measuring element along the axis thereof;

intervening means including rolling members and a retainer for retaining the rolling members interposed between the outer cylinder and the measuring element supporting shaft; and thrust means for pushing means for pushing a lower end face of the measuring element supporting shaft upward at a location displaced from the axis of the measuring element supporting shaft.

8. The apparatus according to claim 7, wherein said measuring element supporting shaft has a tapered hole in the lower end face thereof, the tapered hole having a deepest point located on the axis of the measuring element supporting shaft.

9. The apparatus according to claim 7, wherein said measuring element supporting shaft has an outer diameter slightly smaller than an inner diameter of the intervening means.

10. The apparatus according to claim 7, wherein said measuring element supporting shaft has a projection formed at a portion thereof between the intervening means and the measuring element.

11. The apparatus according to claim 10, wherein said projection of the measuring element supporting shaft has an outer periphery greater than the outer diameter of the measuring element supporting shaft.

12. An apparatus for measuring shape of a frame of spectacles, in which the shape of the frame is measured with a measuring element which is held in contact with a groove in a rim of the frame while being moved along the groove, the apparatus comprising:

holding means for holding the frame at a predetermined hold position;

measuring element actuating means for moving the measuring element to a predetermined horizontal origin position associated with one of right and left rims of the frame, then moving the measuring element to a predetermined vertical origin position in a Z-axis direction parallel to an axis of the measuring element, and holding the measuring element at the predetermined vertical origin position, said measuring element actuating means including:

a movable table moved in a direction perpendicular to the axis of the measuring element;

an outer cylinder mounted on the movable table for guiding the measuring element in an axial direction thereof;

a measuring element supporting shaft having a projection thereon, said supporting shaft extending through the outer cylinder from the measuring element along the axis thereof;

intervening means in a form of a cage including a rolling member and a retainer, interposed between the outer cylinder and the measuring element supporting shaft below said supporting shaft projection, wherein said projection of the measuring element supporting shaft is located such that it contacts an upper end of the intervening means when the intervening means is located at a predetermined lowest position and at the same time the measuring element supporting shaft is located at a predetermined lowest origin position;

thrust means for pushing a lower end face of the measuring element supporting shaft upward at a location displaced from the axis of the measuring element supporting shaft; and positioning means including first moving means for moving the measuring element, held at the predetermined vertical origin position, horizontally toward the frame and pressing the measuring element against the frame with a biasing force, the positioning means positioning the measuring element at a measurement position by means of the first moving means.

* * * * *

UNITED STATES PATENT AND TRADEMARK OFFICE
CERTIFICATE OF CORRECTION

PATENT NO.: 5,515,612
DATED : May 14, 1996
INVENTOR(S): IGARASHI et al.

It is certified that error appears in the above-identified patent and that said Letters Patent is hereby corrected as shown below:

On the cover page, Item [54], the first word in the title "APPARTUS" should read --APPARATUS--.

Signed and Sealed this

Twenty-fourth Day of September, 1996

Attest:

BRUCE LEHMAN

*Attesting Officer*   *Commissioner of Patents and Trademarks*